United States Patent [19]
Bishop

[11] Patent Number: 5,848,379
[45] Date of Patent: Dec. 8, 1998

[54] METHOD FOR CHARACTERIZING SUBSURFACE PETROPHYSICAL PROPERTIES USING LINEAR SHAPE ATTRIBUTES

[75] Inventor: Glen W. Bishop, LaPorte, Tex.

[73] Assignee: Exxon Production Research Company, Houston, Tex.

[21] Appl. No.: 984,963

[22] Filed: Dec. 4, 1997

Related U.S. Application Data

[60] Provisional application No. 60/052,379, Jul. 11, 1997.
[51] Int. Cl.$^6$ .................................................. G06F 19/00
[52] U.S. Cl. .................................................................. 702/6
[58] Field of Search ................................... 702/6, 11–14; 367/73

[56] References Cited

U.S. PATENT DOCUMENTS

| | | | |
|---|---|---|---|
| 5,487,001 | 1/1996 | Neff | 364/421 |
| 5,596,548 | 1/1997 | Krebs | 702/14 |
| 5,638,269 | 6/1997 | Fournier et al. | 364/422 |
| 5,648,937 | 7/1997 | Campbell | 702/14 |
| 5,691,958 | 11/1997 | Calvert et al. | 702/14 |

OTHER PUBLICATIONS

Fournier, F., "A statistical methodology for deriving reservoir properties from seismic data," *Geophysics*, Sep.–Oct., 1995.

Ziemer and tranter, *Principles of Communications—Systems, Modulation, and Noise*, Houghton Mifflin Company, 1976, p. 71.

*Primary Examiner*—Donald E. McElheny, Jr.
*Attorney, Agent, or Firm*—Keith A. Bell

[57] ABSTRACT

A method for analyzing seismic intervals and predicting subsurface petrophysical properties through the use of a new set of attributes known as Linear Shape Attributes (LSAs). The Linear Shapes form an orthogonal basis set derived directly from the seismic data traces for the interval in question. Collectively, the LSAs capture substantially all of the useful information contained in the input data set. The input data set may include all or a selected portion of the seismic data traces for the prospect. Petrophysical information obtained from well logs and/or pseudo-well logs may be used to calibrate the LSAs. The calibrated LSAs may then be used for a variety of purposes, such as predicting subsurface petrophysical properties at other locations or determining the location of a new well. The LSAs may also be used to determine reconstruction errors which are a measure of the consistency between the seismic data traces used to determine the LSAs and a second set of seismic data traces or pseudo-well synthetic data traces. These reconstruction errors may be plotted on maps to geographically locate areas of consistency or inconsistency.

36 Claims, 14 Drawing Sheets

METHOD FOR CHARACTERIZING SUBSURFACE PETROPHYSICAL PROPERTIES USING LINEAR SHAPE ATTRIBUTES

This application claims benefit of USC Provisional Appln. No. 60/052,379, filed Jul. 11, 1997.

FIELD OF THE INVENTION

This invention relates generally to the field of seismic prospecting and, more particularly, to seismic facies analysis. Specifically, the invention is a method for characterizing and predicting geological, petrophysical, and geophysical properties of a subsurface formation from seismic data using a new set of seismic attributes, Linear Shape Attributes.

BACKGROUND OF THE INVENTION

In the oil and gas industry, seismic prospecting techniques are commonly used to aid in the search for and evaluation of subterranean hydrocarbon deposits. In seismic prospecting, a seismic source is used to generate a seismic signal that propagates into the earth and is at least partially reflected by subsurface seismic reflectors (i.e., interfaces between underground formations having different elastic properties). The reflected signals (known as "seismic reflections") are detected and recorded by seismic receivers located at or near the surface of the earth, in an overlying body of water, or at known depths in boreholes, and the resulting seismic data may be processed to yield information relating to the subsurface formations.

Seismic prospecting consists of three separate stages: data acquisition, data processing, and data interpretation. The success of a seismic prospecting operation depends on satisfactory completion of all three stages.

The seismic energy recorded by each seismic receiver during the data acquisition stage is known as a "seismic data trace." Seismic data traces typically contain both the desired seismic reflections and one or more unwanted noise components which can obscure or overwhelm the seismic reflections. One of the primary objectives of the data processing stage is to remove or at least attenuate these unwanted noise components so that the desired seismic reflections can be clearly identified and interpreted.

One method for attenuating unwanted noise components in seismic data traces is through the common-midpoint (CMP) stacking process. As will be well known to persons skilled in the art, the "midpoint" for a seismic data trace is the point midway between the source location and the receiver location for that trace. According to the CMP method, the recorded seismic data traces are sorted into common-midpoint gathers each of which contains a number of different seismic data traces having the same midpoint but different source-to-receiver offset distances. The seismic data traces within each CMP gather are corrected for statics (e.g., the effects of variations in elevation, weathered layer thickness and/or velocity, or reference datum) and normal moveout (i.e., the variation of traveltime with respect to source-to-receiver offset) and are then summed or "stacked" to yield a stacked data trace which is a composite of the individual seismic data traces in the CMP gather. Typically, the stacked data trace has a significantly improved signal-to-noise ratio compared to that of the unstacked seismic data traces. The stacked data traces may then be used to predict the petrophysical properties of the subsurface.

Current methods that use seismic data traces to predict or characterize subsurface petrophysical properties differ in how the relate the seismic data to the subsurface properties. These methods fall into two general categories: 1) methods that directly use the seismic data traces; and 2) methods that indirectly use the seismic data traces. Direct methods use assumed subsurface properties to create synthetic data traces which are then compared with the actual data traces. If the synthetic data traces do not match the actual data traces, the assumed subsurface properties are perturbed and new synthetic data traces are created. This process is repeated until the synthetic data traces match the actual data traces. The assumed subsurface properties used to create the matching synthetic data traces are then taken to be the actual subsurface properties for the location of the actual data traces. Indirect methods avoid direct use of the seismic data traces by calculating seismic attributes (e.g., maximum amplitude or dominant frequency) that individually capture different aspects of the seismic data. These attributes are then calibrated with the subsurface properties of interest using well log data. When an insufficient number of wells are available for calibration, modeling of pseudo-wells to fill in the missing subsurface property variability (or dynamic range) is necessary. The calibrated attributes may then be used to predict the occurrence of the subsurface properties of interest at other locations in the seismic data volume. Occasionally, a combination of both direct and indirect methods is used to predict subsurface properties. For example, seismic attributes may be used to help constrain the geologic/spatial part of the solution in direct methods.

An example of a direct method for predicting subsurface petrophysical properties is disclosed in U.S. Pat. No. 5,487,001 to Dennis B. Neff. Neff's method makes use of the principle that a seismic trace can be represented by the convolution of a seismic wavelet with a sequence of reflection coefficients characterizing the subsurface at the location of the seismic trace. The reflection coefficients can be obtained from sonic and/or density logs in a well at the reference location. Neff's approach is to modify the known subsurface properties at the well location in an attempt to capture the full range of each property's variation in the seismic interval of interest. Based on knowledge of the geology of the area, the seismic analyst predicts the possible variation of the subsurface formation properties away from the well. These possible variations can be translated into a set of modified well logs (also known as "pseudo-well logs"). A large suite of pseudo-well synthetics are then created from these modified well logs. Finally, these pseudo-well synthetics are catalogued and compared to the actual seismic data traces at locations other than the reference location to determine the pseudo-well synthetic that best matches the actual seismic data.

Direct methods which are based on a comparison of pseudo-well synthetics to seismic data traces, such as Neff s method described above, have certain deficiencies. First and foremost is the problem of non-uniqueness. Often, several pseudo-well synthetic traces corresponding to quite different physical properties may give equally good matches with an actual seismic trace. This problem may be addressed by imposing constraints on the predicted solution; however, this increases the risk of not being able to capture the spatial geological variability in the seismic data. A second deficiency of methods similar to Neff's method arises from the fact that the modeled synthetic traces may only be applicable over a subset of the exploration prospect area because the relationship between the subsurface properties and the seismic data may not remain constant over the entire prospect. Another deficiency of these methods is that many of the modeled pseudo-well synthetic traces may not be related to the geological or reservoir properties within the prospect interval.

An example of an indirect method for predicting subsurface petrophysical properties from seismic data is described in Fournier, F., "A statistical methodology for deriving reservoir properties from seismic data," *Geophysics*, September–October, 1995. Fournier's approach is an attempt to calculate seismic attributes that account for most of the seismic variance and calibrate these attributes with a set of geologic properties computed for each well. According to Fournier, if the reservoir time thickness varies only slightly over the entire field, then a constant time-thickness interval may suffice for analysis. If a constant time-thickness interval can be used, then Principal Component analysis may possibly reduce the number of samples to a smaller number of related samples or Principal Components. This smaller set of Principal Components, linear combinations of the original data samples, can be used as seismic attributes. Fournier then attempts to establish a correlation between these attributes and the geologic parameters.

Fournier's approach has a number of deficiencies. First, the method requires that the geologic interval of interest have a constant time thickness. Real world reservoirs rarely satisfy this condition. Second, Fournier does not address the need for resampling the data when the time interval is small (as discussed in the Appendix below). Third, Fournier does not account for residual structural variation that arises when the top and bottom of the interval of interest do not fall precisely at time sample values. Fourth, Fournier does not remove reservoir-interval bias (i.e., that part of the seismic data that is the same from one trace to the next in the zone of interest) from the input data. A large bias may account for most of the energy in the interval, but may have little significant geologic variability (i.e., little usable geologic information).

Further, Fournier provides little insight into: 1) how best to segment the reservoir interval into statistically meaningful subgroups for prediction of subsurface properties; 2) how pseudo-well synthetics can be compared to the actual seismic data statistics to eliminate inappropriately modeled pseudo-wells; 3) how to select the best spatial locations for real wells used in modeling and analysis; 4) how to determine if modeled pseudo-wells adequately represent the seismic data (or sample the attribute space); and 5) how to determine, spatially, where prediction of subsurface properties will have the smallest uncertainty given the locations of the calibration wells. Fournier relies on unsupervised clustering techniques to derive the seismic facies that are assumed to provide a natural segmentation of the reservoir into district geologic subpopulations. Unfortunately, distinct geologic facies do not necessarily coincide with these seismic facies. Extreme caution must be exercised when attempting to segment the reservoir based on these clustered seismic facies.

Seismic attributes used in indirect methods for analyzing and predicting subsurface properties may not completely characterize the seismic interval of interest. If the information content in the seismic data is not sufficiently captured (both vertically and spatially), then it is impossible to predict the subsurface properties of interest with acceptable accuracy at locations away from wells in the survey area. Current methods are also incapable of quantifying the degree to which the information content in the seismic data traces is insufficiently captured.

Because large numbers of conventional attributes are available for calibration and prediction, current indirect methods must be based on a subset of these attributes. Selection of this attribute subset is difficult at best, and it is often unclear as to whether the selected subset adequately captures the information content in the seismic data.

From the foregoing, it can be seen that an improved method for predicting and characterizing subsurface petrophysical properties using seismic data traces is needed. Such a method should make use of well logs and selective use of pseudo-well logs in conjunction with the seismic data, and should avoid the non-uniqueness problem that arises in obtaining a match between pseudo-well synthetics and actual seismic data traces. Such a method should also provide diagnostics about the range of applicability of pseudo-well logs in the exploration area of interest. Preferably, the method should calculate seismic attributes that account for substantially all of the variability in the seismic data, and these attributes should be related to meaningful geologic parameters. The method should provide insight on how best to partition the reservoir interval into statistically meaningful subgroups for prediction of subsurface properties. It should also provide diagnostics on how to select the best well locations for modeling and analysis and diagnostics on the validity of pseudo-well logs. Finally, such a method should be able to account for variations in the thickness of the geologic zone of interest and variations in geologic structure in a 3-D data volume. The present invention satisfies these needs.

SUMMARY OF THE INVENTION

In one embodiment, the present invention is a method for determining a set of independent waveform shapes which characterize seismic data trace segments corresponding to a geologic zone of interest comprising the steps of: (a) datuming the seismic data trace segments so as to horizontally align the data trace segments; (b) determining the maximum length T of any of the seismic data trace segments and identifying all seismic data trace segments having a length equal to T; (c) for each of the seismic data trace segments having a length less than T, augmenting the seismic data trace segment by adding a sufficient number of data samples so that the augmented length equals T; (d) defining a matrix $\underline{A}^T$ consisting of all maximum length seismic data trace segments identified in step (b) and all augmented seismic data trace segments from step (c) where said maximum length seismic data trace segments and said augmented seismic data trace segments form the columns of said matrix $\underline{A}^T$; (e) computing the average value of each row of matrix $\underline{A}^T$ to obtain an average data trace segment; (f) subtracting the average data trace segment from each column in matrix $\underline{A}^T$ to obtain matrix $A^T$; and solving the eigenvalue problem $[A^T A]V = \Lambda^2 V$ for V, where matrix A is the transpose of matrix $A^T$, V is a matrix of the independent waveform shapes which characterize the seismic data trace segments, and $\Lambda$ is the singular value matrix for the eigenvalue problem. The independent shapes in matrix V comprise the "Linear Shapes" of the present invention. Following solution of the eigenvalue problem, the matrix equation $C = AV$ may be solved, where C is a matrix of weights for each of the Linear Shapes in each of the seismic data trace segments. A set of weights corresponding to a particular Linear Shape comprise one "Linear Shape Attribute" or "LSA." The datuming performed in step (a) may be top conformance (horizontally aligning the tops of the seismic data trace segments), symmetrical conformance (horizontally aligning the middles of the seismic data trace segments), or bottom conformance (horizontally aligning the bottoms of the seismic data trace segments). For short time intervals, the method may include an optional resampling at a higher data rate in order to capture substantially all of the information content in the data trace segments. The LSAs may be determined on the basis of all of the seismic data trace segments in the geologic zone of interest or, optionally, on a subset of the trace segments which encompasses some interesting geologic/seismic feature.

The LSAs, calculated as described above, may be used for a variety of purposes. For example, the LSAs may be calibrated with well log data from actual well logs and/or pseudo-well logs, and the calibrated attributes may be used to predict subsurface petrophysical properties at locations where no well exists. The results of these predictions may be used to select the locations for new wells.

The LSAs may also be used to verify if modeled pseudo-well synthetics contain the same information content as the original seismic data set. If not, the pseudo-well synthetics may be eliminated from the calibration set and the assumptions made in generating these synthetics may be discarded. A variety of methods, including reconstruction error analysis, cluster-matching, and range matching, may be used to statistically compare the pseudo-well synthetics with the LSAs.

The LSAs may also be used to make drilling decisions for a location outside the area where the LSAs were derived. Seismic data traces for this new location are processed in a manner similar to that used to determine the LSAs (i.e., datumed, augmented, optionally resampled, and bias removed). Then, a set of weights are calculated for each of the Linear Shapes to determine the consistency between the LSAs and each of the seismic data traces for the new location. If the data traces are consistent with the LSAs, the LSAs may be used in making drilling decisions for the new location.

Other uses for the LSAs will be readily apparent to persons skilled in the art based on the teachings set forth herein.

In another embodiment, the invention is extended to determine geometric (i.e., multi-trace) attributes which capture substantially all of the geometric patterns in the data set. This is accomplished by selecting a reference trace and concatenating the reference trace with a number of adjacent seismic data trace segments to form a supertrace segment. A set of these supertrace segments may then used in the same manner as described above to determine a set of Linear Supershapes. These Linear Supershapes may be deconcatenated to yield a set of Linear Pattern Attributes or LPAs that may be used to describe the local variation of the seismic data in the neighborhood of the reference trace. The LPAs may be used in the same manner as described above for the LSAs.

BRIEF DESCRIPTION OF THE DRAWINGS

The present invention and its advantages will be better understood by referring to the following detailed description and the attached drawings in which.

The invention will be described in connection with its preferred embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications, and equivalents which are included within the spirit and scope of the invention, as defined by the appended claims.

DETAILED DESCRIPTION OF THE PREFERRED EMBODIMENTS

The present invention is a method for analyzing seismic intervals and predicting subsurface petrophysical properties through the use of a new set of attributes known as "Linear Shape Attributes" or "LSAs." These new attributes remove many of the ambiguities and problems associated with the use of traditional seismic attributes.

Preferably, the inventive method is practiced using a suitably programmed digital computer. Persons skilled in the art of seismic data processing and interpretation could easily develop computer software for performing the method based on the teachings set forth herein.

Figure 1A:
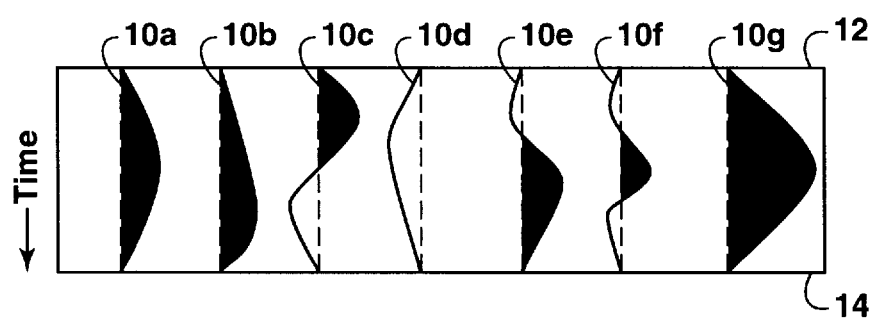
FIGS. 1A and 1B illustrate, respectively, a set of windowed seismic data trace segments and the finite set of independent waveform shapes derived from the data trace segments according to the present invention.
Figure 1B:
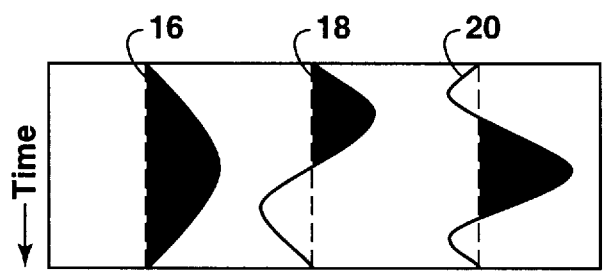

Linear Shape Attributes are based on the concept that a seismic data trace is composed of a finite set of independent waveform shapes. This concept is similar to Fourier analysis which states that any waveform can be represented by a weighted sum of sinusoids. These sinusoids jointly form an orthogonal basis set (i.e., a basis set for an inner product space consisting of mutually orthogonal vectors). In the case of LSAs, the orthogonal basis set (i.e., the finite set of independent waveform shapes) is derived directly from the seismic data traces. For example, FIG. 1A shows, for illustrative purposes, a number of windowed seismic data trace segments 10a through 10g extending from a first time 12 to a second time 14. FIG. 1B shows the finite set of independent waveform shapes (i.e., the Linear Shapes) derived from data trace segments 10a through 10g according to the present invention. Note that for this example, the Linear Shapes tend to measure quantities such as average shape 16, skewness/asymmetry 18, and sharpness/peakness 20. Each Linear Shape has a length (number of time samples) equal to the seismic interval length of the data trace segments (i.e., the time interval between time 12 and time 14 in FIG. 1A). As used herein, the term "linear" means that the seismic trace segments can be reconstructed using a weighted sum of the independent waveform shapes. These weights become the attributes. A set of weights that corresponds to a particular Linear Shape (one value per trace) is one Linear Shape Attribute. Thus, there is one LSA for each of the Linear Shapes (e.g., shapes 16, 18, and 20 in FIG. 1B), and each LSA represents the amount of the corresponding Linear Shape in each of the seismic data trace segments.

The Linear Shapes are calculated using a mathematical method similar to Empirical Orthogonal Function Analysis or EOFA, a known method for solving the. Factor Analysis problem. The EOFA method transforms the Factor Analysis problem into a singular-value-decomposition (SVD) problem.

The Linear Shape Attributes present in a set of seismic data trace segments may be determined from the following matrix equation:

$$A = CV^T \quad (1)$$

where, $A^T$ = matrix of seismic data trace segments within the reservoir/geologic zone of interest (e.g., trace segments 10a through 10g in FIG. 1A), minus a bias term computed as described below, and matrix A is the transpose of matrix $A^T$, C = matrix of Linear Shape Attributes/weights (i.e., matrix that contains the amount of each Linear Shape in each seismic data trace segment), V = matrix of Linear Shapes that are in the seismic data trace segments (e.g., shapes 16, 18, and 20 in FIG. 1B), and matrix $V^T$ is the transpose of matrix V.

Equation (1), as set forth above, does not have a unique solution. However, there is a unique solution to the corresponding singular-value-decomposition problem, $$A = U\Lambda V^T, \quad (2)$$

where $\Lambda$ are the singular values and $C = U\Lambda$.

In practice, the singular values and Linear Shapes are found from the solution of an equation that is derived from equation (2). This equation is as follows:

$$[A^T A] V = \Lambda^2 V \quad (3)$$

Thus, the matrix of Linear Shapes (V) and the matrix of singular values ($\Lambda$) can be found after $[A^T A]$ is calculated on the seismic interval. Equation (3) is a standard eigenvalue-eigenvector problem that has a well defined solution for V and $\Lambda$.

A manipulation of Equation (1) shows that the LSA attributes (matrix C) can be found through the solution of the following matrix equation:

$$C = AV \quad (4)$$

Following the solution of equation (3), both A and V are known and, therefore, C may easily be determined.

Typically, the seismic data trace segments falling within the seismic interval of interest are not horizontally aligned and do not all have the same length. In this case, the trace segments must be appropriately datumed and the lengths augmented as necessary so that all trace segments have the same number of data samples. Datuming permits the geology to be correctly aligned spatially so that the LSAs will calibrate with the properties of interest. Augmentation is necessary because the singular-value-decomposition calculation method described above requires that the data trace segments have equal lengths.

Figure 2A:
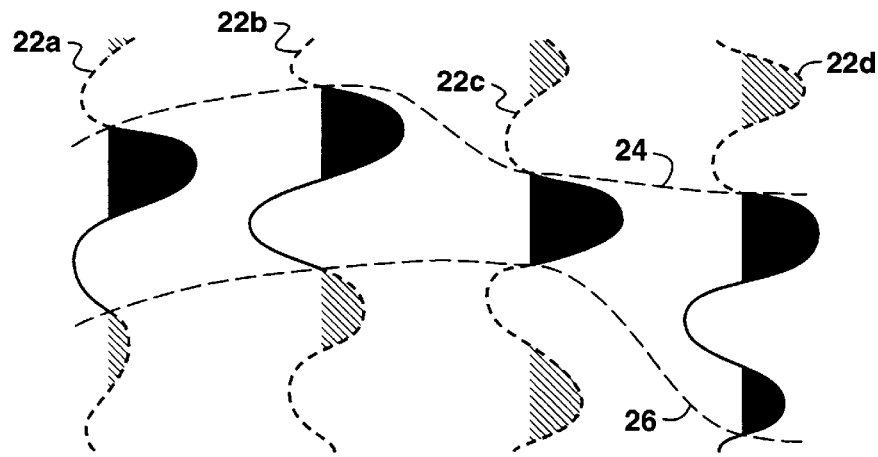
FIG. 2A shows a set of seismic data trace segments and FIGS. 2B, 2C, and 2D illustrate, respectively, datuming of the data trace segments by top conformance, symmetric conformance, and bottom conformance.
Figure 2B:
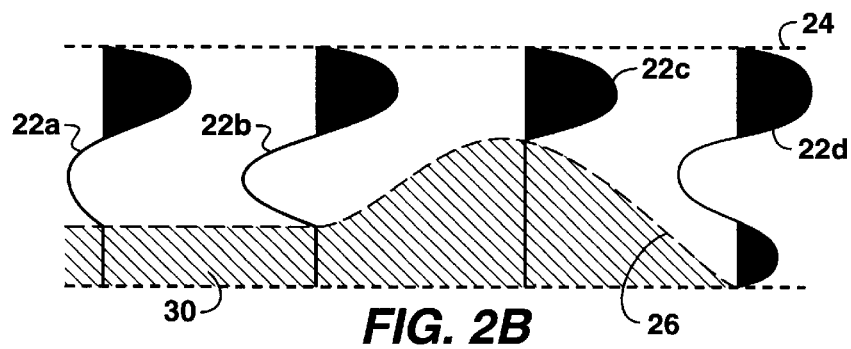

The datuming and augmentation processes may be further understood with reference to FIGS. 2A through 2D. FIG. 2A shows a series of seismic data trace segments 22a through 22d. Also indicated in FIG. 2A are the top 24 and the bottom 26 of a geologic zone of interest which may be determined in any conventional manner. In the example shown, the top, the bottom, and the time thickness of the zone of interest vary from one trace segment to another. The present invention may utilize any of three different kinds of datuming illustrated in FIGS. 2B, 2C, and 2D. In FIG. 2B, the seismic trace segments have been shifted so as to align the top 24 of the geologic zone of interest on the four traces; in FIG. 2C, the seismic trace segments have been shifted so as to align the middle 28 of the geologic zone of interest on the four traces; and in FIG. 2D, the seismic trace segments have been shifted so as to align the bottom 26 of the geologic zone of interest on the four traces. The type of datuming to be used for a particular application must be determined by the analyst on the basis of the known or anticipated geology of the subsurface.

During the datuming step, any residual structural variation resulting from the fact that the top and/or bottom of the interval of interest do not fall precisely at time sample values may be removed. This may be done by interpolating new samples at the precise interval boundaries, by resampling the entire trace segment (at the same or, optionally, at a higher sampling rate, as discussed more fully below) beginning at the interval boundary, or by other methods known to persons skilled in the art.

Trace augmentation is accomplished by first determining the input trace segment(s) having the longest length T and then augmenting the length of each other input trace segment so that it equals T. Preferably, augmentation is done by adding zeros to the trace segment at the same sampling rate as the trace segments (i.e. zero padding). Other methods of trace augmentation (e.g., padding with non-zero sample values) could be used and are within the scope of the present invention. Returning to FIGS. 2B through 2D, the trace augmentation is represented by the shaded areas 30.

Figure 2C:
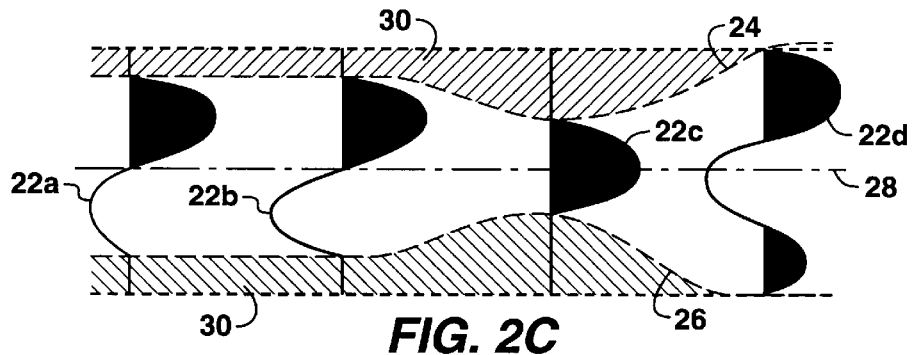
Figure 2D:
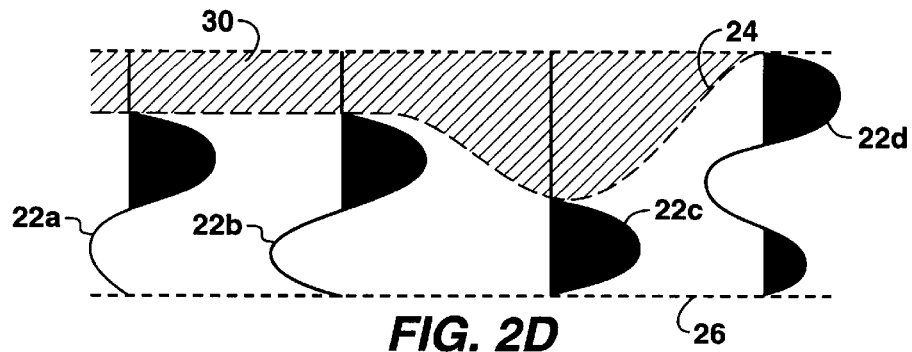

The result of the datuming and trace augmentation processes is a set of seismic data trace segments which are correctly aligned according to the geology of the subsurface interval of interest (i.e., top conformance, symmetrical conformance, or bottom conformance as illustrated in FIGS. 2B, 2C, and 2D respectively) and which have identical lengths of T, thereby permitting use of the singular-value-decomposition method for calculating the Linear Shapes.

Persons skilled in the art will recognize that trace augmentation is not necessary for the case where all of the seismic data trace segments have the same length (i.e., a constant time-thickness interval). In that case, the Linear Shapes calculated according to the present invention are equivalent to the Principal Components used by Fournier, as described above. The resulting Principal Component LSAs may be used in the same manner as and for the same purposes as other LSAs described herein.

If the minimum seismic interval in the data trace segments is extremely short, e.g., three data samples or less, then it may be necessary to resample the data at a higher sample rate in order to completely capture the information content in the data trace segments. A good estimate of the minimum data sample rate needed to capture the information content may be obtained from the following equation:

$$f_s = 2\beta + \frac{2}{\tau} \quad (5)$$

where $f_s$ is the minimum necessary data sample rate in samples per second, $\beta$ is the data bandwidth in Hz, and $\tau$ is the smallest interval time duration in seconds. The minimum sample rate needed for a particular data set may be obtained by solving equation (5) for the smallest time interval in the seismic interval of interest. The entire data set must be resampled at the resulting sample rate. The derivation of equation (5) is set forth in the Appendix below.

In the most general case, all of the seismic data traces in the 2D or 3D data volume are used in the LSA determination. Thus, all independent waveform shapes that are in the data set, within the seismic interval of interest, will be calculated. A complete set of LSAs captures all of the reflectivity information content in the seismic interval. The amount of information captured by each of the Linear Shapes may also be determined from the method of the present invention. Because the LSA attributes are uncorrelated with one another (a direct result of the LSA method), they each measure different information in the data (i.e., each contains unique information) and thus form a minimum set. A minimum set consists of the smallest number of attributes necessary to characterize a seismic trace interval. This is a major advantage over traditional seismic attribute analysis where detailed searches are required to identify a minimum set from a large group of attributes.

The method of the present invention may be modified such that the Linear Shapes are calculated on the basis of a subset of the complete seismic data volume. In this case, the matrix $[A^T A]$ in equation (3) is calculated on the specified subset. This subset may be of higher data quality or may encompass some interesting geologic/seismic feature.

One of the primary uses of Linear Shape Attributes is for predicting subsurface petrophysical properties. In order to do so, well log data from one or more calibration wells is required to calibrate the LSAs. Theoretically, to perform a statistically meaningful calibration using linear regression, the number of calibration wells must be at least two greater than the number of attributes to be calibrated. Non-linear and nonparametric regression techniques may require even more calibration wells. Thus, if the number of calibration wells available is small relative to the complete LSA set, then a smaller set of attributes from the complete LSA set must be chosen. Fortunately, since the least significant Linear Shapes at the bottom of the LSA hierarchy (see below) are usually a measure of uncorrelated noise, their exclusion often provides a desirable filter.

Table 1 shows a typical LSA hierarchy obtained through use of the present invention.

TABLE 1

Typical LSA Hierarchy

| Shape No. | % Variance Captured | Accumulated % Variance | Usefulness |
|---|---|---|---|
| 1 | 73.94 | 73.94 | Useful/Predictable |
| 2 | 15.76 | 89.70 | " |
| 3 | 8.82 | 98.52 | " |
| 4 | 1.25 | 99.77 | " |
| 5 | 0.20 | 99.97 | Marginally Useful |
| 6 | 0.01 | 99.98 | Noise/Unpredictable |
| 7 | 0.01 | 99.99 | " |
| 8 | 0.01 | 100.00 | " |

The LSA hierarchy is derived from the solution of equation (3) which, as noted above, yields the matrix V and the matrix $\Lambda$. Matrix $\Lambda$ is a diagonal matrix of singular values $\Lambda_1$ to $\Lambda_n$, i.e., $$\begin{bmatrix} \Lambda_1 & 0 & 0 & \ldots & 0 \\ 0 & \Lambda_2 & 0 & \ldots & 0 \\ 0 & 0 & . & & . \\ . & . & & . & . \\ . & . & & . & . \\ . & . & & & . \\ 0 & 0 & \ldots & \ldots & \Lambda_n \end{bmatrix}$$

where $\Lambda_1$ corresponds to Linear Shape 1, $\Lambda_2$ corresponds to Linear Shape 2, etc., and n is the number of Linear Shapes. For each of the Linear Shapes, the % Variance in the LSA hierarchy is determined from the following equation:

$$\% \text{ Variance}_i = \frac{\Lambda_i^2}{\sum_{i=1,n} \Lambda_i^2} (100) \quad (6)$$

Those attribute shapes at the top of the LSA hierarchy measure the part of the seismic data that may be used for prediction, i.e., the part that carries the useful information. To choose the appropriate set of LSAs, the analyst simply selects those attributes which represent the most significant Linear Shapes (i.e., the ones which individually capture the most information) depending on the degree of precision desired and the number of calibration wells available. For example, in the LSA hierarchy shown in Table 1, Shape Nos. 1 through 5 capture 99.97% of the useful information in the seismic data set.

Figure 3:
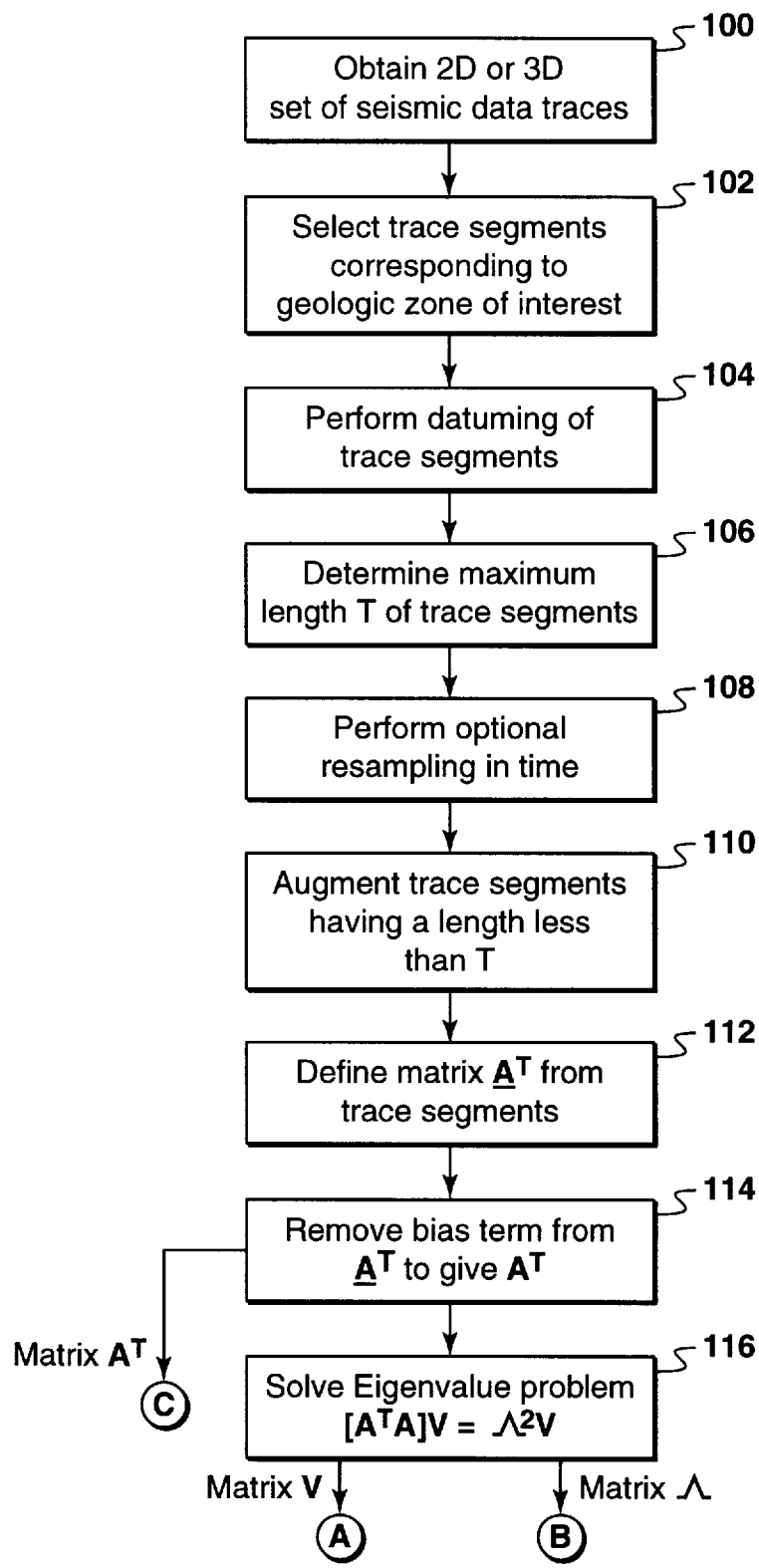
FIG. 3 is a flowchart illustrating the basic steps of the present inventive method for determining the finite set of Linear Shapes present in a set of seismic data traces.

FIG. 3 is a flow chart illustrating the basic steps of the present inventive method for determining the finite set of Linear Shapes present in a set of seismic data traces. At step 100, a set of seismic data traces is obtained. These data traces may be from either a two-dimensional (2-D) or a three-dimensional (3-D) seismic survey. Preferably, the data traces are stacked data traces so as to take advantage of the signal-to-noise ratio improvement resulting from the redundancy in the CMP method. If desired, the stacked data traces may be converted to zero phase stacked data traces prior to application of the present invention. The inventive method may also be used with zero-offset unstacked seismic data traces, and may even be extended to prestack seismic traces to capture seismic variability with offset.

At step 102, seismic data trace segments corresponding to the geologic zone of interest are selected. In a typical seismic survey, several seconds of digitized seismic data are recorded, corresponding to reflections from many thousands of meters of the subsurface of the earth. Typically, the geologic zone of interest would be a relatively small portion of the subsurface. The seismic reflections corresponding to the geologic zone of interest may be determined, for example, from well log data or, alternatively, through any other method known in the art.

At step 104, the trace segments are datumed, as described above. This permits the trace segments to be properly aligned according to the geology of the geologic zone of interest.

Next, at step 106, the trace segment or segments having the largest length T are determined. For example, with respect to the four trace segments shown in FIGS. 2A through 2D, trace segment 22d is the longest. At step 108, the optional resampling described above may be performed; although persons skilled in the art will understand that this resampling may be performed at other places in the processing sequence without adversely affecting the results thereof. At step 110, the trace augmentation is performed, as described above in connection with FIGS. 2B through 2D. Preferably, trace augmentation is performed by adding zeros to each trace segment having a length less than T so that its augmented length equals T; however, other types of trace augmentation may be used if desired.

The next step of the inventive method, step 112, is to define a matrix $\underline{A}^T$ of the trace segments. This matrix should include both the trace segment(s) having the longest length T and the other augmented trace segments. This step is best understood with reference to FIGS. 2B through 2D. Matrix $\underline{A}^T$ is simply a matrix representation of the datumed and augmented trace segments, i.e., the columns of $\underline{A}^T$ are the trace segments being processed (e.g., trace segments 22a through 22d in FIGS. 2B, 2C, or 2D), and within each column time increases as the row index increases and the values of each element of the matrix are the trace amplitude value at the time corresponding to the row index.

The average value of each row of matrix $\underline{A}^T$ is computed to give a bias term i.e., the amount by which the average row value departs from a reference value which, in this case, is zero. Referring to FIGS. 2B through 2D, the bias term is simply the average of the four trace segments or the average trace segment. At step 114, this bias term or average trace is subtracted from each column in matrix $\underline{A}^T$ to give a matrix $A^T$. Matrix $A^T$ will be used in solving equation (3). Matrix $A^T$ has x columns and y rows where x is the number of traces and y=T/Δt+1 (T is the maximum length of the trace segments and Δt is the digitization interval or sample-rate interval).

Next, at step 116, equation (3) is solved yielding the matrix V and the matrix Λ. Matrix V is the finite set of Linear Shapes present in the input data trace segments. In general, matrix V will have y rows and y columns where y=T/Δt+1 (as above). Each of the columns is a Linear Shape and is represented by a unique singular value. As noted above, the matrix Λ is a diagonal matrix of singular values $\Lambda_i$ (i=1,n) where n is the number of Linear Shapes. Persons skilled in the art will understand that n (the number of Linear Shapes) is equal to y.

Following solution of equation (3), both matrix A and matrix V are known. Thus, equation (4) may now be solved for matrix C, the LSAs. This is illustrated at step 118 in FIG. 4. In general, matrix C will have n columns and x rows, where n is the number of Linear Shapes and x is the number of traces. Each column of matrix C corresponds to a different Linear Shape, and the rows of matrix C give the weights associated with each Linear Shape in the respective trace segments.

Linear Shape Attributes may be used for a variety of purposes. For example, LSAs can be used to verify if modeled pseudo-well synthetics contain the same statistical information content as the original 2D or 3D seismic data set. As is well known to persons skilled in the art, pseudo-well synthetics are synthetic seismograms derived from pseudo-well logs. Similarly, pseudo-well logs are logs derived from the actual well logs by varying layer thickness or other properties such as porosity or hydrocarbon saturation. These pseudo-well logs, and their corresponding pseudo-well synthetics, may potentially exist somewhere in the data set. Pseudo-well synthetics which do not contain the same statistical information as the original data set may be eliminated from the calibration set and the assumptions made in generating these synthetics may be discarded. Because the LSAs are orthogonal and uncorrelated, many standard statistical measures can be used to compare the pseudo-well synthetics with the real seismic data.

Figure 5:
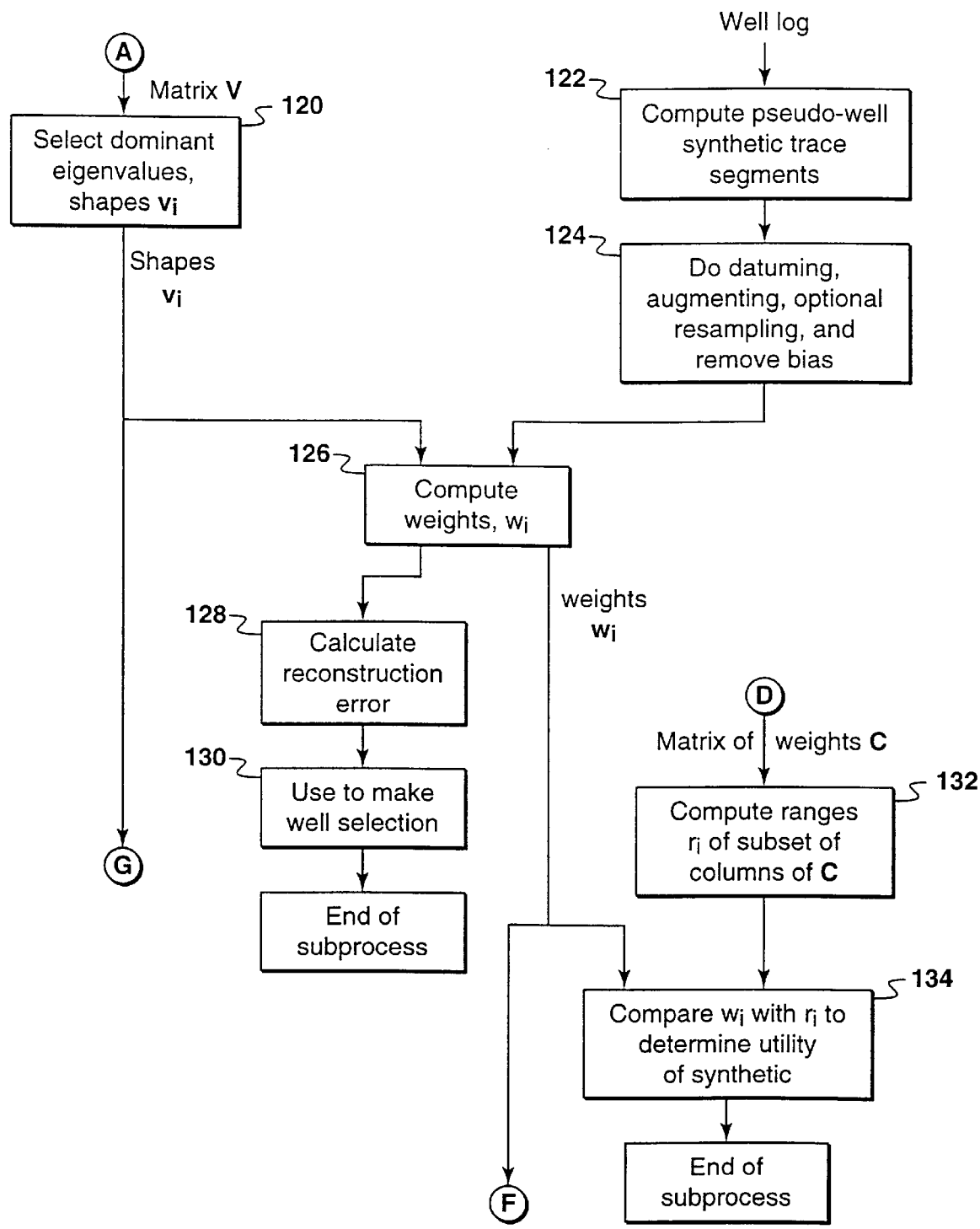
FIG. 5 is a flowchart illustrating one process that may be used for comparing pseudo-well synthetics with the finite set of Linear Shapes present in a set of seismic data traces.

FIG. 5 illustrates one process that may be used for comparing pseudo-well synthetics with the finite set of Linear Shapes present in a set of seismic data traces. Two sets of information are required for this process. The first is the matrix V which was calculated at step 116 (FIG. 3), and the second is well log information. At step 120, the individual shapes $v_i$ having the largest eigenvalues associated with them are selected. At step 122, one or more pseudo-well synthetic trace segments corresponding to the geologic zone of interest are computed on the basis of the well log information. As is well known in the art, calculation of pseudo-well synthetics requires knowledge of the seismic wavelet. For purposes of the present description, it will be assumed that the seismic wavelet is known. If the wavelet is not known, an assumed wavelet may be used. At step 124, the pseudo-well synthetic trace segments are datumed, augmented, and optionally resampled in the same manner as described above with respect to the actual data trace segments (steps, 104, 108, and 110 in FIG. 3). Further, the bias (i.e., the average trace segment) calculated at step 114 in FIG. 3 should be removed from the pseudo-well synthetic trace segments.

Next, at step 126, the vector dot product of each pseudo-well synthetic trace segment with each of the Linear Shapes is calculated according to the following formula:

$$w_i = \sum_j s_j v_{ij} \qquad (7)$$

where $w_i$ is a set of weights for each of the Linear Shapes, $s_j$ is the jth sample of the pseudo-well synthetic trace segment in question after removal of bias (i.e., $s_j = \hat{s}_j - bias_j$ where $\hat{s}_j$ is the actual pseudo-well synthetic trace segment and $bias_j$ is the average value of the jth sample of all of the seismic data trace segments in matrix $\underline{A}^T$), and $v_{ij}$ is the jth sample of the Linear Shape $v_i$. The summation in equation (7) is over the number of time samples in the maximum length trace segments, y.

FIG. 5 shows two methods for evaluating the consistency of the pseudo-well synthetic trace segments with the LSAs based on the computed weights. One method is to calculate reconstruction error according to the following equations:

$$E_{RESIDUAL} = \frac{\sum_j \left( s_j - \sum_i w_i v_{ij} \right)^2}{\sum_j s_j^2} (100) \qquad (8a)$$

-continued $$E_{TOTAL} = \frac{\sum_j \left(s_j - \sum_i w_i v_{ij}\right)^2}{\sum_j (s_j + \text{bias}_j)^2} (100) \quad (8b)$$

where $E_{RESIDUAL}$ and $E_{TOTAL}$ are, respectively, the reconstruction errors (in percent) of the residual (i.e., after removal of bias) trace segment and the total trace segment. In equations (8a) and (8b), $s_j$ is the jth sample of the residual pseudo-well synthetic trace segment, $w_i$ are the weights from equation (7) for each Linear Shape, $v_{ij}$ is the jth sample of Linear Shape $v_i$, the summation over i is from i=1,m where m is the selected number of shapes for analysis (i.e., the most significant shapes according to the LSA hierarchy), and $\text{bias}_j$ is the average value of the jth sample of all of the original seismic data trace segments (as determined at step 114 in FIG. 3). Residual reconstruction errors, $E_{RESIDUAL}$, are a measure of how effective the selected group of LSAs are in capturing the spatial variance or information content in a specific trace. Full trace reconstruction errors, $E_{TOTAL}$, measure how well a specific trace can be reconstructed by a subset of chosen LSAs. Large reconstruction errors mean that the pseudo-well synthetic trace segment cannot be adequately represented by the Linear Shapes and that the pseudo-well synthetic trace segment does not correlate well with the original seismic data trace segments.

The reconstruction error can be used, step 130, to determine which pseudo-wells should be used in the calibration process. For example, if the reconstruction error is large at certain pseudo-wells when actual well logs were used in computing the pseudo-well synthetics, then these pseudo-wells should be excluded from the calibration. A real well may also be excluded if the related pseudo-well synthetics have large reconstruction errors.

Figure 4:
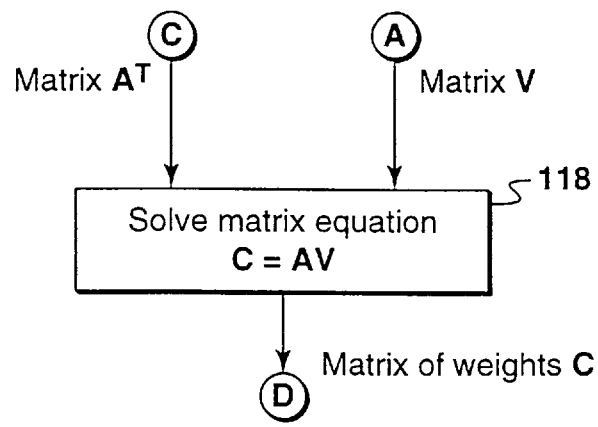
FIG. 4 is a flowchart illustrating the determination of the Linear Shape Attributes.

A second method for evaluating the consistency of the pseudo-well synthetic trace segments with the LSAs is also shown in FIG. 5. This method utilizes the weights calculated at step 126 and the matrix C which was previously calculated at step 118 (FIG. 4). As noted above, each column of matrix C corresponds to a different Linear Shape and the elements of each column of matrix C are the weights associated with that Linear Shape in the respective seismic trace segments used in deriving matrix C. At step 132, the ranges $r_i$ of a selected subset of the columns of matrix C are computed. The range for a particular Linear Shape Attribute (column in matrix C) is all attribute values between the maximum and minimum values. For example, all values from $LSA1_{max}$ to $LSA1_{min}$, where LSA1 are the weights for Linear Shape No. 1 in matrix C. The selected columns of matrix C are the ones which correspond to the largest singular values of the matrix $\Lambda$. At step 134, the ranges $r_i$ are then compared with the weights $w_i$ computed in step 126. This comparison of the weights $w_i$ for a particular Linear Shape in a pseudo-well synthetic trace segment with the range of weights $r_i$ for the same Linear Shape in the actual seismic trace segments gives another useful comparison. As will be readily apparent to persons skilled in the art, this comparison could be performed by plotting a histogram of a Linear Shape Attribute (i.e., the frequency of occurrence of the weights in a particular column of matrix C) and then determining whether $w_i$ for that Linear Shape in a particular pseudo-well synthetic trace segment falls inside or outside the histogram statistical distribution. If $w_i$ for a particular Linear Shape in a pseudo-well synthetic trace segment does not fall within the range of weights $r_i$ for that Linear Shape in the original seismic data traces, then the pseudo-well synthetic trace segment is inconsistent (i.e., outside the statistics of the original seismic data) with the LSAs.

Figure 6:
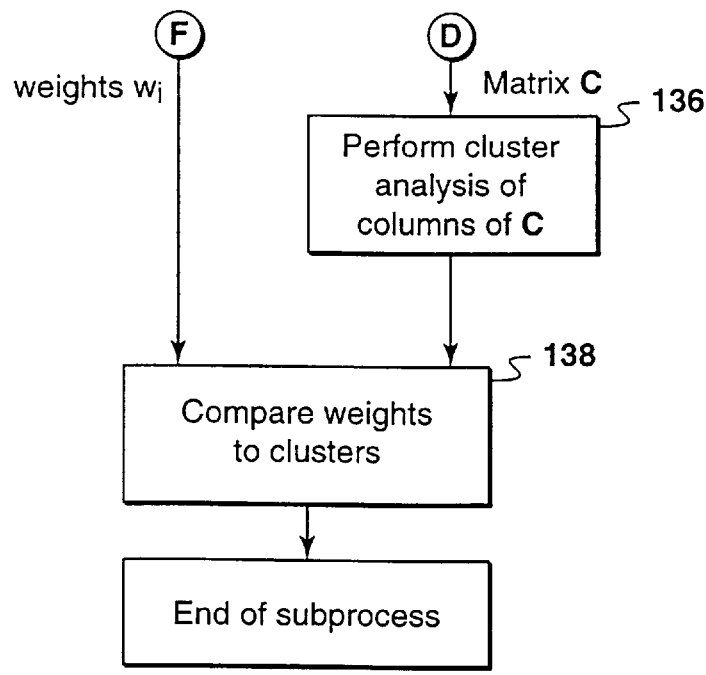
FIG. 6 is a flowchart illustrating the use of cluster analysis for evaluating the consistency of pseudo-well synthetics with the Linear Shape Attributes.

FIG. 6 illustrates yet another method for evaluating the consistency of the pseudo-well synthetic trace segments with the LSAs. At step 136, a cluster analysis is performed on the columns of matrix C. In other words, the LSA attributes for each trace are cross plotted in multidimensional space. Often, the traces will form natural clusters which may be described as seismic facies types. Next, at step 138, the clusters are compared to the weights $w_i$ calculated at step 126 (FIG. 5). The weights should fall within the clusters derived from the actual seismic data trace segments. This comparison gives a diagnostic of the adequacy of the sampling of the pseudo-well synthetic seismic traces by the Linear Shapes. Based on this comparison, a decision may be made to exclude pseudo-wells that do not match the clusters from the seismic data set.

Other methods for evaluating the consistency of the pseudo-well synthetic trace segments with the LSAs will be apparent to persons skilled in the art based on the teachings set forth herein. All such other methods are included within the scope of the present invention.

Figure 7:
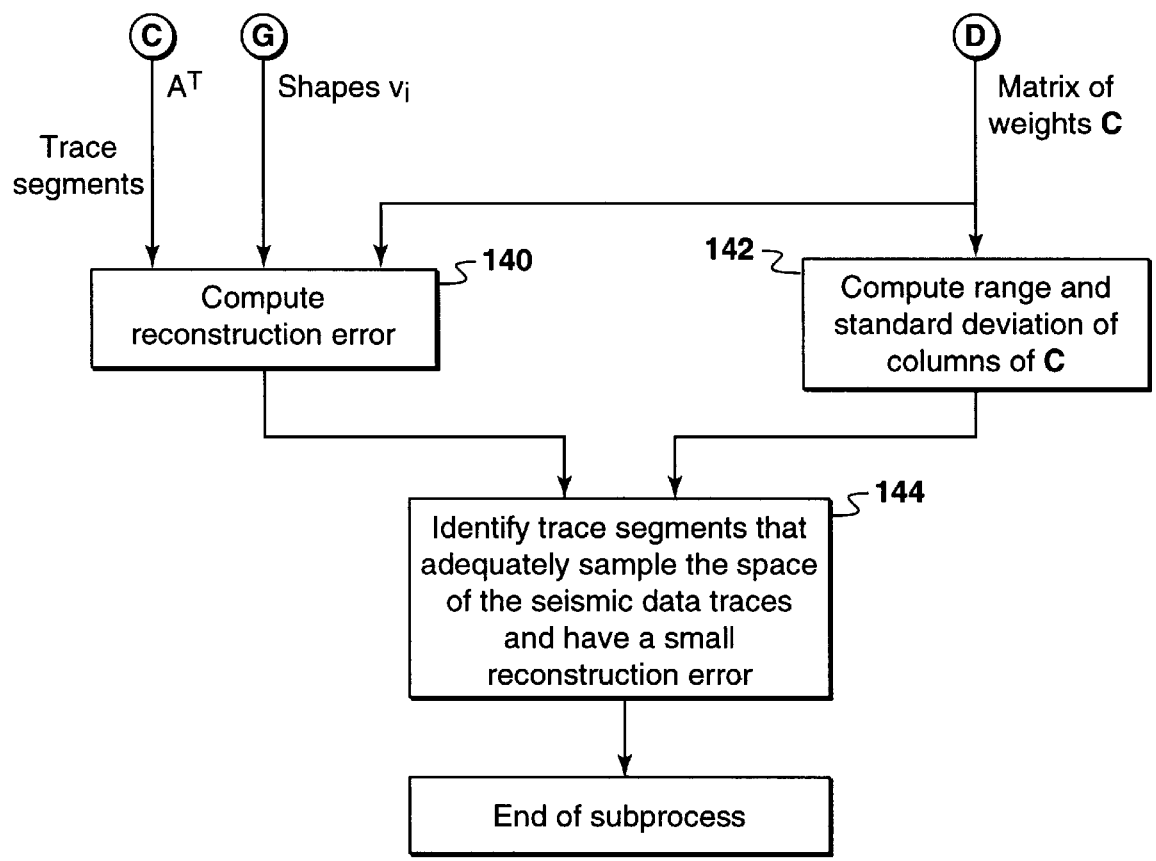
FIG. 7 is a flowchart illustrating a process for identifying a subset of the seismic data trace segments that adequately sample the space of the seismic data.

The present invention may also be used to identify a subset of seismic trace segments that adequately sample the space of the seismic data, as defined by the top LSAs (attributes with largest eigenvalues). Turning now to FIG. 7, this subprocess begins with the matrix $A^T$ (i.e., the seismic trace segments after removal of the bias) determined at step 114 (FIG. 3), the shapes $v_i$ with the largest eigenvalues selected at step 120 (FIG. 5), and the matrix C determined at step 118 (FIG. 4). At step 140, reconstruction error is calculated for each of the trace segments using equations similar to equations (8a) and/or (8b). Reconstruction error maps may be created to aid in identifying areas of the prospect where the seismic data is inconsistent with the LSAs. Next, at step 142, the range and standard deviations of the elements of each column of matrix C are computed. Finally, at step 144, a subset of trace segments that adequately sample the space of the seismic data traces and have a small reconstruction error are identified.

Preferably, each Linear Shape that is used in the calibration should, at a minimum, be sampled close to its extreme values. Wells chosen for calibration purposes should have seismic trace segments in their proximity that cover the extreme values of the weights associated with each of the Linear Shapes. In addition, the reconstruction error should be small. The results of this subprocess may be used to answer two types of questions. The first is how to choose a well location that will yield the most useful information. The second, assuming the well locations are already chosen, is which traces are outside the calibration distance (space) of the calibration wells. A well site that has weights at the extreme values is desirable. For a minimum number of wells, a well site where the weights are closely grouped within the range of weights is not desirable. For a particular Linear Shape, the well site weights should preferably have a separation in value of at least one standard deviation.

Another aspect of the present invention is the ability to determine how adequately the wells sample the actual seismic data. As noted above, the columns of matrix C correspond to the different Linear Shapes and the rows to the seismic trace segments. For each column, some of the rows will correspond to trace segments in the proximity of a well for which petrophysical information is available. Locations for which the elements of any column of matrix C lie outside the range sampled by wells can be identified and mapped to show areas of which the well locations do not adequately sample the seismic data.

Figure 8:
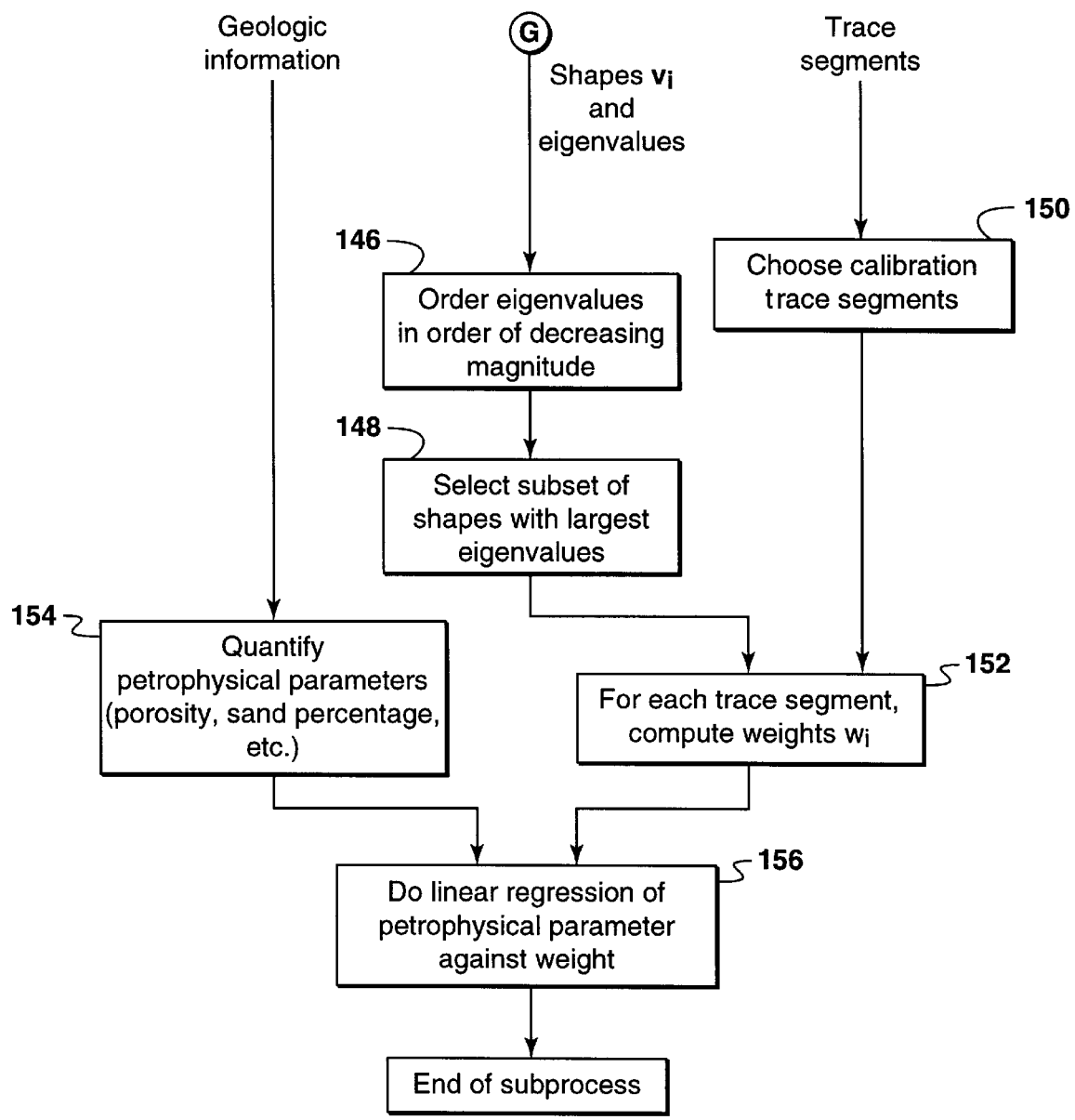
FIG. 8 is a flowchart illustrating the process of calibrating the Linear Shape Attributes.

The process of LSA calibration is illustrated in FIG. 8. Three sets of input information are needed: geologic (petrophysical) information from wells or pseudo wells, the set of Linear Shapes $v_i$ and the associated eigenvalues resulting from solution of equation (3) above, and the seismic trace segments. The geologic (petrophysical) information may include, for example, porosity and sand percentage within the geologic interval of interest. Other types of petrophysical information which may be used in connection with the present invention will be well known to persons skilled in the art.

As discussed above, Table 1 shows a typical LSA hierarchy. According to the present invention, at step 146, the eigenvalues of matrix $\Lambda$ are sorted in order of decreasing magnitude. With respect to the LSA hierarchy shown in Table 1, the first eigenvalue captures 73.94% of the useful information in the data set, the second eigenvalue captures 15.76% of the information, the third eigenvalue captures 8.82% of the information, and so on. Next, at step 148, the analyst selects a subset of the Linear Shapes corresponding to the dominant eigenvalues. With respect to Table 1, the analyst might select, for example, the first three Linear Shapes which collectively account for 98.52% of the useful information in the seismic data set. If a sufficient number of calibration wells are available, the analyst might decide to select Linear Shapes 1 through 5 which collectively account for substantially all of the useful information in the data set.

Next, at step 150, a calibration set of trace segments is chosen. If the trace segments are pseudo-well synthetic trace segments, the choice is made on the basis of one of the methods described above in connection with FIG. 5. If the trace segments are actual seismic data trace segments, the choice is made as described above in connection with FIG. 7.

At step 152, a set of weights $w_i$ for the dominant Linear Shapes is computed for each of the calibration trace segments using an equation similar to equation (7). Of course, if actual data trace segments are used for the calibration, the weights are those from matrix C, as calculated at step 118 (FIG. 4). Alternatively, if pseudo-well synthetic trace segments are used in the calibration, the weights are those calculated at step 126 (FIG. 5).

The petrophysical parameters (porosity, sand percentage, etc.) corresponding to each of the calibration wells or pseudo wells are quantified at step 154. Methods for quantifying these petrophysical parameters would be well known to persons skilled in the art and, accordingly, will not be further described herein. The petrophysical parameters typically will be averaged within the well logs at the same depth corresponding to the trace segments at the wells.

Finally, at step 156, a linear regression is performed for each petrophysical parameter to relate the petrophysical parameter to the weights $w_i$. The method of linear regression would be well known to persons skilled in the art. The result of the linear regression is a set of regression coefficients that best predict the petrophysical parameter from the weights of the Linear Shapes. These coefficients may also be used to predict the petrophysical properties associated with a test trace segment (e.g., a trace segment from outside the survey area) using the weights associated with the dominant Linear Shapes for the test trace segment.

Another aspect of the present invention is the ability to make drilling decisions for locations outside the area where the LSAs were derived. These decisions would be based on the LSAs calculated as described above, a set of seismic data traces from the potential drilling location, and any other available information, such as a geologic or geophysical prediction as to where a suitable well location might be.

Figure 9:
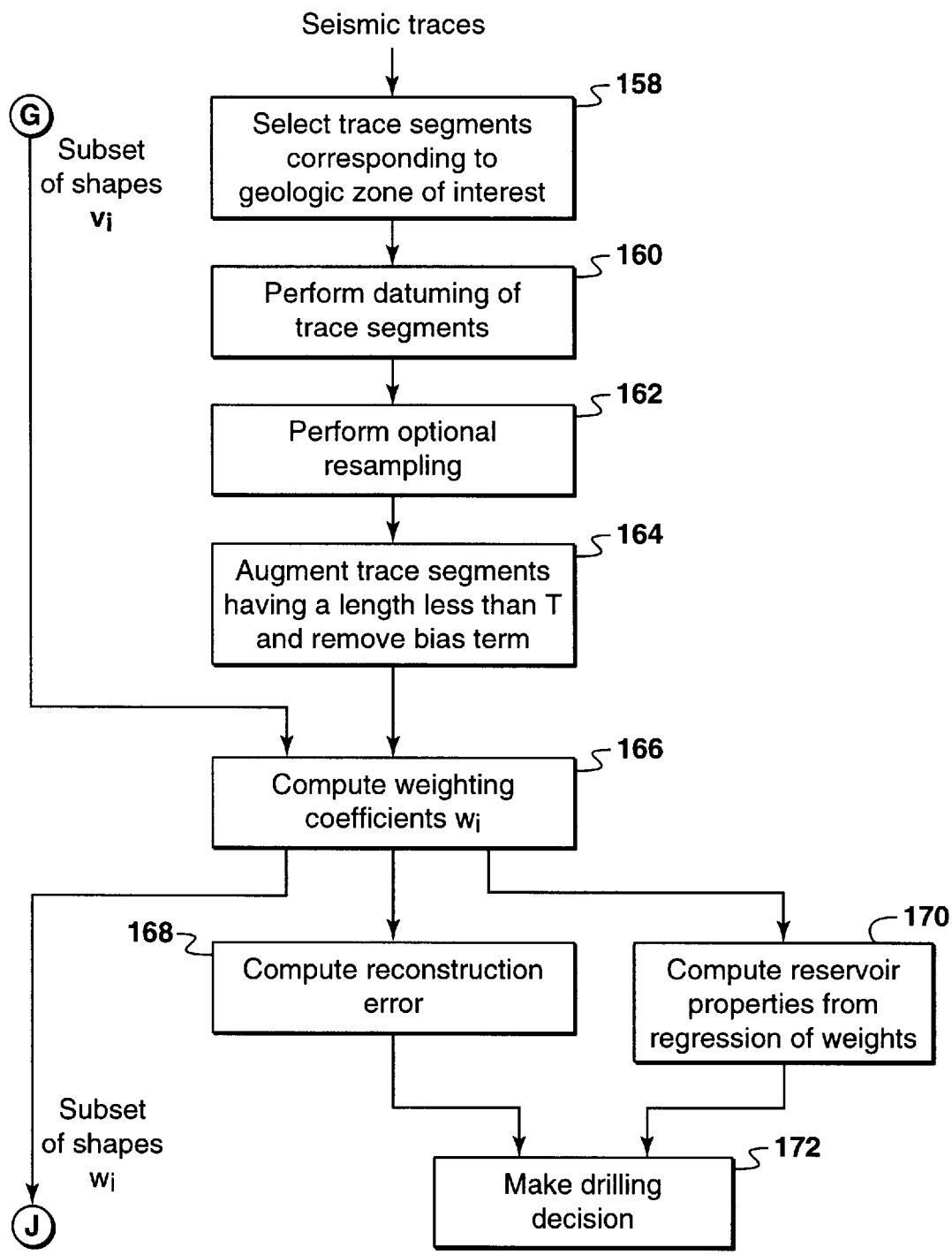
FIG. 9 is a flowchart illustrating a process for using the Linear Shape Attributes to make drilling decisions for locations outside the area where the LSAs were derived.

This embodiment of the present invention is illustrated in FIG. 9. The seismic data traces from the potential drilling location are processed in a manner similar to the processing of the set of seismic data traces from which the LSAs were derived. First, at step 158, trace segments corresponding to the geologic zone of interest are selected. Next, at step 160, the trace segments are datumed to correctly align them. An optional resampling of the data to a higher frequency may be performed at step 162. Next, at step 164, the trace segments are augmented to the maximum length T as determined at step 106 (FIG. 3). If the maximum interval size of this second set of seismic trace segments is greater than T, then the LSAs from the first set of seismic trace segments should be recomputed on the basis of this greater length. Also, at step 164, the bias from the original set of seismic data trace segments (calculated at step 114 in FIG. 3) is removed from the second set of seismic trace segments.

Next, at step 166, a set of weights $w_i$ for each of the second set of seismic trace segments is calculated using an equation similar to equation (7) except that in this case $s_j$ is the jth sample of an actual seismic trace segment rather than a pseudo-well synthetic trace segment. The subset of Linear Shapes $v_i$ determined at step 120 (FIG. 5) would be used in making this calculation.

At step 168, reconstruction error ($E_{RESIDUAL}$ and/or $E_{TOTAL}$) is calculated for each of the second set of seismic trace segments using equations similar to equations (8a) and (8b) above. The reconstruction error is a measure of how well the second set of seismic trace segments can be represented by the Linear Shapes (which were derived from the first set of seismic trace segments). Small reconstruction errors mean that the Linear Shapes adequately represent the second set of seismic trace segments. Additionally, the range of attribute values should be checked and a cluster analysis should be performed, as described above in connection with FIGS. 5 and 6. Together, reconstruction error analysis, cluster analysis, and range comparisons jointly determine if the statistics of the two data sets are the same or similar.

In parallel with step 168, a prediction of petrophysical parameters is made at step 170. This prediction uses the weights derived at step 166 and the coefficients derived in the calibration process at step 156 (FIG. 8). Finally, at step 172, the results of steps 168 and 170 are used to make drilling decisions at the new location.

Persons skilled in the art will recognize that other calibration methods (e.g., nonlinear regression and methods based on the use of neural nets) could be used in connection with the present invention. All such calibration methods are intended to be within the scope of the present invention.

Figure 10:
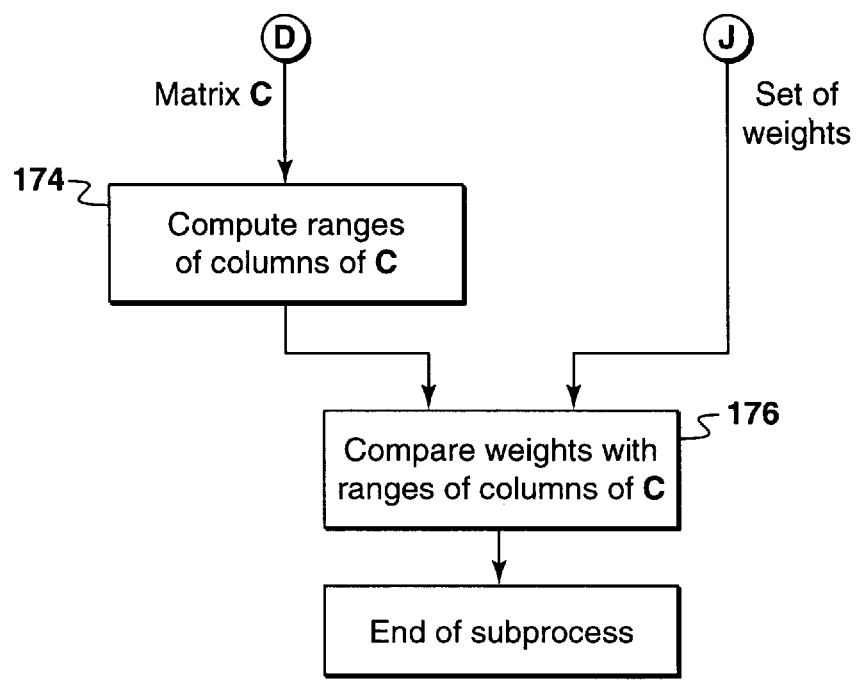
FIG. 10 is a flowchart of a process for determining the statistical consistency between a set of Linear Shape Attributes and a second set of seismic data trace segments.

The present invention also permits the second set of seismic data trace segments to be checked for statistical consistency with the LSAs. A subprocess for determining statistical consistency is illustrated in FIG. 10. This subprocess uses matrix C which was determined at step 118 (FIG. 4) and the set of weights $w_i$ determined at step 166 (FIG. 9). At step 174, the range of values $r_i$ for each of the columns of matrix C is computed. At step 176, the ranges $r_i$ are compared with the weights $w_i$. If the weights lie outside the ranges for the corresponding Linear Shape, then the LSAs may be inconsistent with the second set of seismic trace segments and should be used with caution. Other methods for measuring consistency, e.g., using clustering methods, could be used and are considered to be within the scope of the present invention.

Persons skilled in the art would recognize that the present invention provides a powerful means of capturing information about the overall variation of seismic trace segments within a geologic interval of interest. Linear Shape Attributes are non-geometric (i.e., they are single trace attributes). However, the invention may be extended to determine geometric (multi-trace) attributes which capture substantially all of the geometric patterns in the data set. These geometric attributes take into account the two and/or three dimensional aspects of the data.

Figure 11:
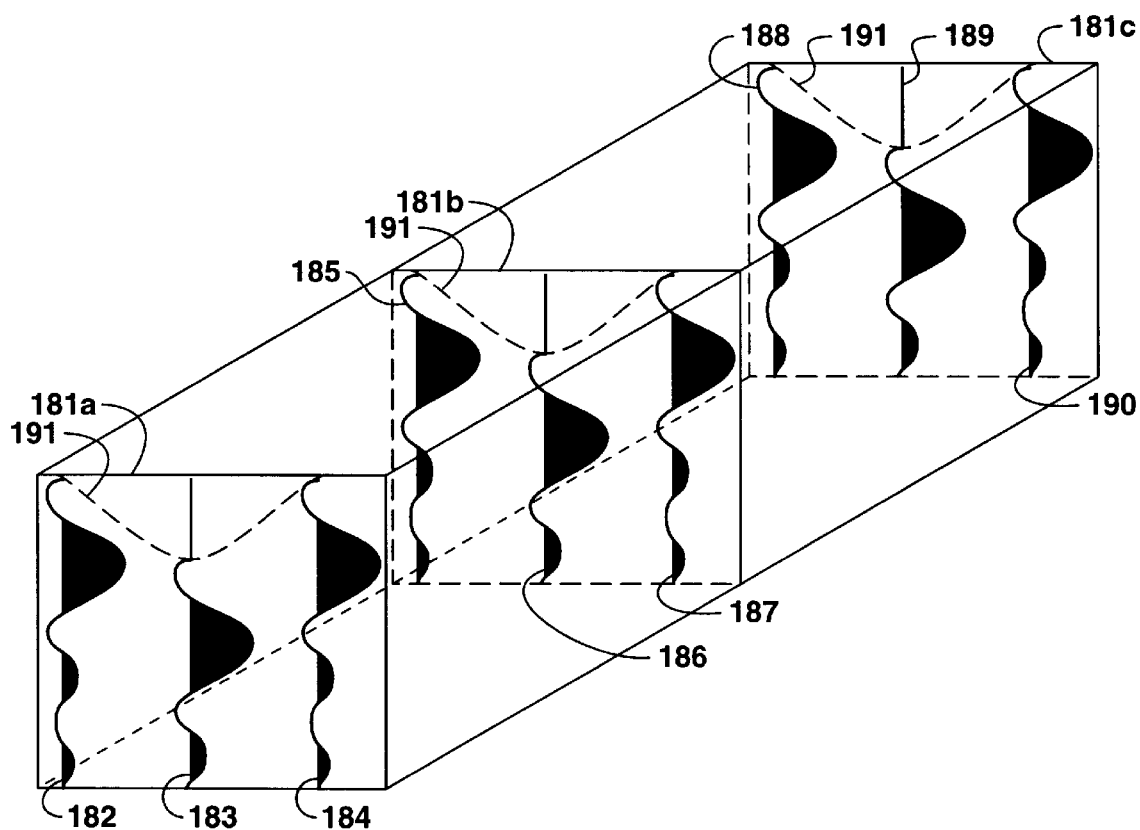
FIG. 11 shows a 3 trace by 3 trace section of a 3D seismic data volume which may be used to determine geometric (multi-trace) attributes.
Figure 12:
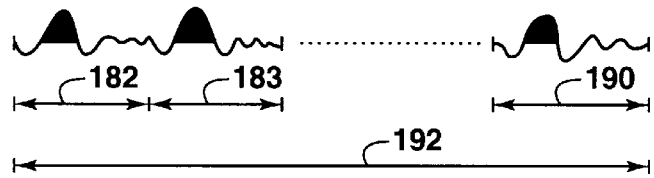
FIG. 12 shows a supertrace segment formed by concatenation of the nine trace segments shown in FIG. 11.

Referring to FIG. 11, for illustrative purposes only, portions of three seismic lines 181a, 181b, and 181c are shown. These seismic lines are laterally spaced apart from each other. On each of these seismic lines, three seismic trace segments, a total of nine trace segments 182 through 190, are shown. The top 191 of the geologic interval of interest is also indicated on the three lines, although it will be understood that bottom conformance or symmetric conformance could be used if warranted by the geology in question. The nine seismic trace segments capture information about the local variability of the seismic data away from a reference trace (i.e., trace 186, the middle trace of the middle line). According to this aspect of the present invention, the nine trace segments are concatenated to produce a single "supertrace segment" nine times as long as the individual trace segments (the individual trace segments would be augmented as described above so that they all have the same length). An example of a supertrace segment 192 is shown in FIG. 12.

Supertrace segments are then defined at other selected locations in the 3-D seismic data grid. These supertrace segments are then used in the various aspects of this invention in exactly the same manner as the individual seismic data trace segments were used. A matrix of supertrace segments may be defined in the same manner as the matrix $A^T$ (step 114 in FIG. 3). Solution of the eigenvalue problem proceeds in the same manner as described above. The end result is set of "Linear Supershapes" each of which is nine times as long as the individual trace segments. Deconcatenation of the Linear Supershapes yields a set of Linear Pattern Attributes or LPAs that describe the local variation of the seismic data in the neighborhood of the center trace segment. The deconcatenation is carried out in the reverse order of the concatenation to define a 3×3 Linear Pattern Attribute. Those skilled in the art would recognize that the concatenation may be performed in any order so long as the order is used consistently throughout the 3-D data volume, and so long as the deconcatenation is done in the reverse order from the concatenation.

Reconstruction error maps can then be calculated as described above for the LSAs. Potential uses for the LPAs include seismic facies identification, pattern recognition, and continuity. In addition, it is possible to calibrate the LPAs with well logs, as described above with respect to the LSAs.

Figure 13:
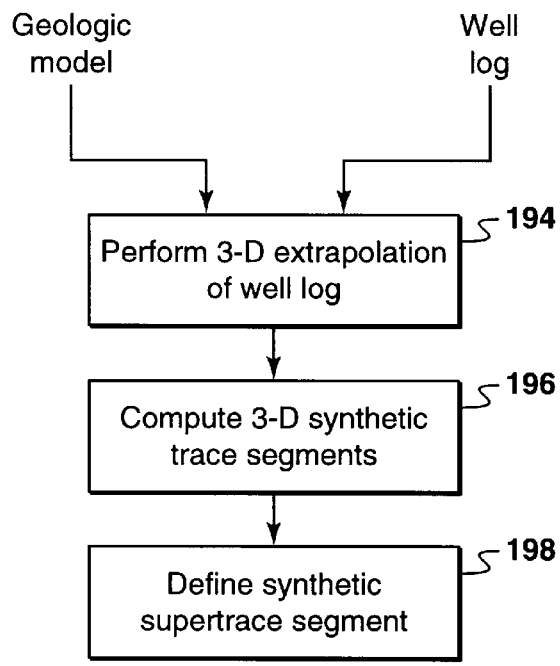
FIG. 13 is a flowchart illustrating the steps involved in defining a synthetic supertrace segment.

By analogy to the pseudo-well synthetics discussed above, a pseudo-well pattern may also be defined. This pseudo-well pattern is obtained by taking a pseudo-well log and using geologic information about possible local variations of the geologic interval of interest in the neighborhood of the "wellsite," to extrapolate the pseudo-well log away from the wellsite. This is shown at step 194 in FIG. 13. Next, at step 196, a suite of nine pseudo-well synthetics are generated at locations centered at the selected location. These nine pseudo-well synthetics are then concatenated at step 198 to define a synthetic supertrace segment. The pseudo-well synthetic supertrace may be used in exactly the same manner as described above with respect to the pseudo-well synthetics.

Persons skilled in the art will recognize that the use of a 3×3 grid to define the supertrace segment is not a limitation of the present invention. Other grid sizes may be used. Moreover, a group of trace segments from a 2-D seismic line may be used to define a 2-D Linear Pattern Attribute useful in seismic facies identification, pattern recognition, and establishing continuity.

Figure 14:
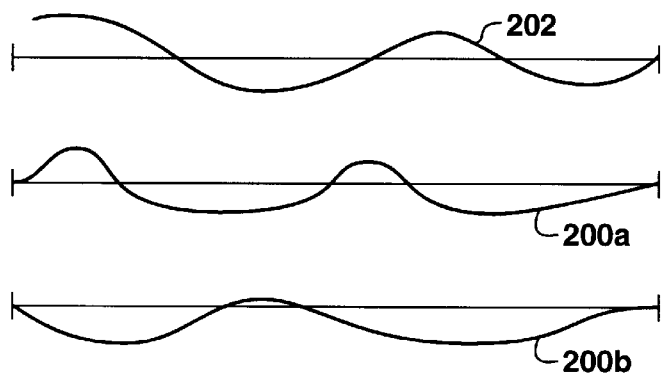
FIG. 14 illustrates the comparison of a traditional seismic attribute with a set of Linear Shape Attributes.

The present invention may also be used to relate the Linear Shapes to traditional seismic attributes. In FIG. 14, the LSAs for a particular data set are represented by curves 200a and 200b (only two shown for clarity) each of which is the weight of a particular Linear Shape for the set of seismic trace segments. These curves are uncorrelated with each other. A similar curve 202 can be defined for any of the traditional attributes used by seismic interpreters. By way of example only, this might be the peak amplitude of the seismic trace segment. A vector dot product of curve 202 with each of curves 200a and 200b is a measure of the correlation of the traditional attribute with each of the LSAs. If a traditional attribute is found to have a high correlation with a LSA that also has a large associated eigenvalue, then the traditional attribute is, in fact, related to something meaningful in the seismic data. If, on the other hand, the traditional attribute is highly correlated with an LSA that has a small associated eigenvalue, then the traditional attribute is measuring noise.

The information in the traditional attribute may be removed from the seismic traces. Once removed, a new reduced set of LSAs can be calculated. The complete set of LSAs, the traditional attribute, and the new reduced LSAs will be uncorrelated with each other. To remove the information of a traditional attribute from the seismic traces, the amount of each Linear Shape, i.e., the amount of each LSA in the traditional attributes, is subtracted from the seismic traces. The amount of each LSA in the traditional attributes is found by performing a vector dot product of curve 202 with each of the curves 200a and 200b. If the traditional attribute is highly related to a rock property of interest, this may be a preferred method of calculating a complete set of attributes for analysis.

Figure 15D:
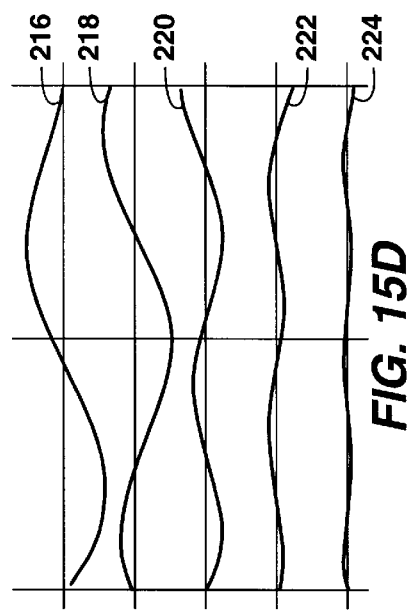
FIGS. 15A through 15E illustrate, respectively, a geologic model in which a sand layer is wedged between two shale layers, a set of model seismic data trace segments derived from the model, the model data trace segments datumed to the middle of the interval, the weight matrix C after computation of the Linear Shapes, and the result of calibration of the LSAs.
Figure 15E:
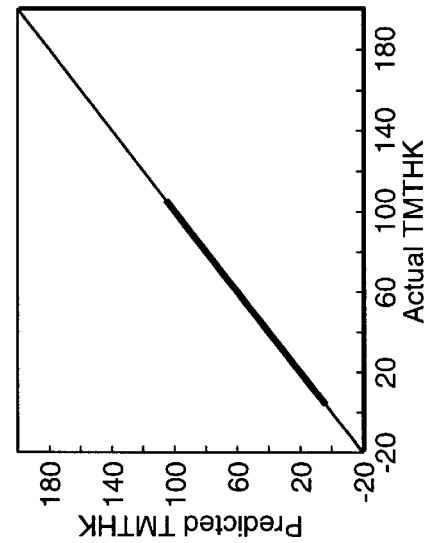
Figure 15A:
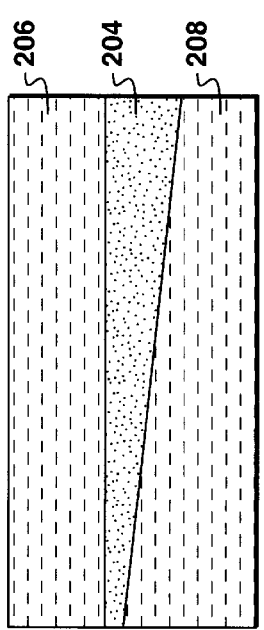
Figure 15B:
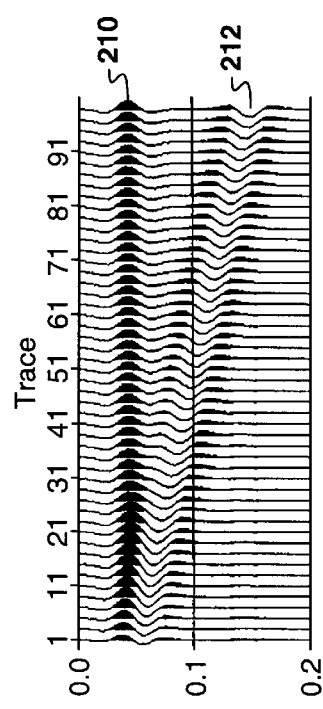
Figure 15C:
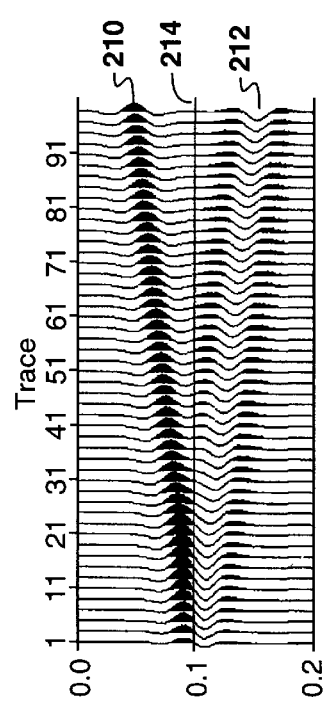

An illustrative example of the use of Linear Shape Attributes is shown in FIGS. 15A–E and 16. FIG. 15A shows a geologic model in which a sand layer 204 is wedged between shale layers 206 and 208. FIG. 15B shows the seismic response of this model by convolving the corresponding reflectivity model with a seismic wavelet. Fifty one seismic traces are shown. The particular wavelet chosen here was a 20 Hz Ricker wavelet. Persons skilled in the art would recognize that other wavelets could have been used to generate the suite of traces show in FIG. 15B. The reflections from the top 210 and the bottom 212 of the sand wedge are also indicated in FIG. 15B. FIG. 15C shows the data of FIG. 15B datumed to the middle of the interval 214. These seismic trace segments were then used to derive a set of LSAs by using the steps of the invention described above. FIG. 15D illustrates the weight matrix C after computation of the Linear Shapes. The weights for the most dominant Linear Shape for the fifty-one traces are shown at 216. The weights for the second through fifth most dominant Linear Shapes are shown, respectively, at 218, 220, 222, and 224. These five dominant Linear Shapes account for 99.9% of the variance of the data.

FIG. 15E shows the result of calibration of the LSAs. FIG. 15E is a plot of predicted versus actual time thickness (in milliseconds) for sand layer 204. A linear regression analysis of the sand thickness against the weights of the five most dominant shapes resulted in a prediction root mean square error of 0.267 milliseconds with a correlation coefficient of approximately 1.0. Additional tests have shown that the effect of incoherent random noise on the predictive performance of the attributes was minimal.

Figure 16:
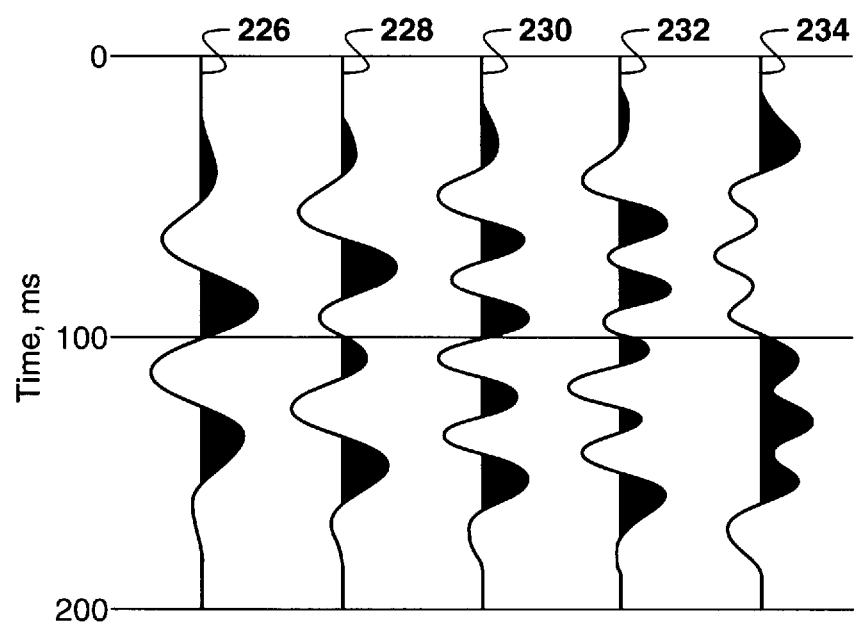
FIG. 16 shows the five most dominant Linear Shapes derived from the data shown in FIG. 15C.

FIG. 16 shows the five dominant Linear Shapes, 226, 228, 230, 232, and 234 derived for the above example using the present invention.

This invention provides an effective method of characterization of subsurface petrophysical properties using seismic attributes. It captures substantially all of the information content in the seismic interval. The hierarchical form of the Linear Shape Attributes makes selection for calibration straightforward. It provides an effective method of calibration of the Linear Shape Attributes with well logs.

The foregoing description is directed to particular embodiments of the present invention for the purpose of illustrating the invention. It will be apparent, however, to one skilled in the art that many modifications and variations to the embodiments described herein are possible. For example, the invention may also be used with shear wave seismic sections and converted-wave seismic sections. Further, the invention could be applied to so-called "impedance seismic sections" (i.e., seismic sections constructed from seismic traces that have been integrated and band-passed so as to approximate the impedance, rather than the reflectivity, of the subsurface). In this case, the LSAs would capture impedance or impedance variability. Similarly, the invention could also be used with shear wave seismic sections and converted-wave seismic sections. All such modifications and variations are intended to be within the scope of the present invention, as defined in the appended claims.

APPENDIX

The purpose of this Appendix is to briefly describe the derivation of equation (5) above, the equation for determining the minimum sample rate necessary for resampling short data trace segments.

According to standard information theory, the maximum number of parameters (attributes) needed to fully represent the information contained in a seismic data trace segment may be determined from the following equation:

$$N_{max} = 2\beta\tau \tag{1A}$$

where $N_{max}$ is the maximum number of attributes necessary to describe the data trace segment, $\beta$ is the bandwidth of the data (in Hz), and $\tau$ is the trace segment length (in seconds). However, standard information theory does not take into account the effects of data-window truncation for short time intervals.

Figure 17A:
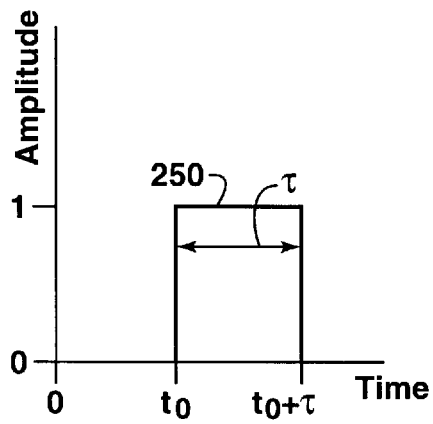
FIGS. 17A through 17C illustrate, respectively, a time window in the time domain, the corresponding sinc function in the frequency domain, and the result of convolving the sinc function with a box-car bandpass original data spectrum.
Figure 17B:
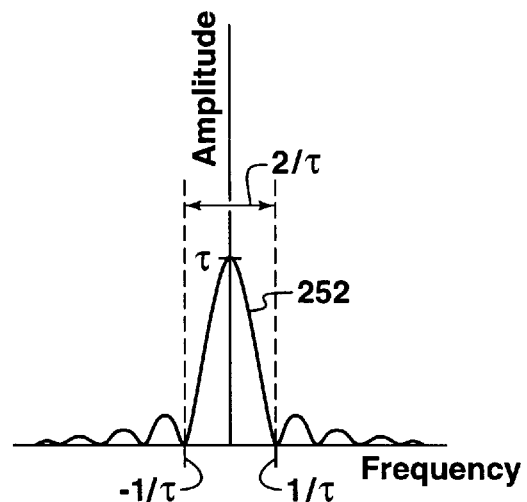
Figure 17C:
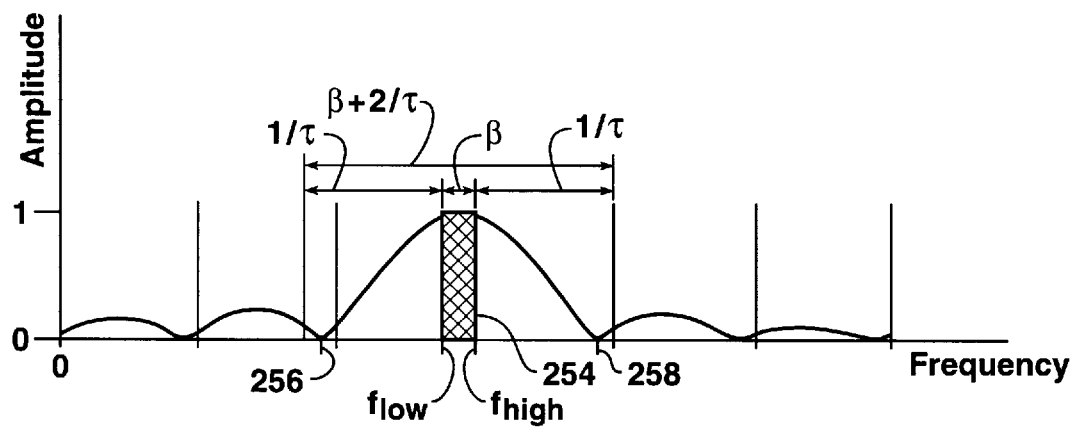

Whenever a sequence of data values (e.g., a seismic data trace) is truncated to a smaller data length, the result in the frequency domain is an increase in bandwidth. This increase in bandwidth is the result of setting the data to zero outside of the truncation window. The application of a truncation window to the data may be interpreted as a multiplication by a rectangular window in the time domain, with a corresponding convolution of a sinc function (the Fourier Transform of a rectangular window) with the original data spectrum in the frequency domain. To illustrate, FIG. 17A shows a typical time window 250 having a width of $\tau$ and an amplitude of unity. Time window 250 extends from time $t_0$ to time $t_0\tau$. FIG. 17B shows the corresponding sinc function 252. The zero crossings of sinc function 252 are at frequencies of $1/\tau$ and $-1/\tau$. FIG. 17C shows the result of convolving sinc function 252 with an assumed box-car bandpass original data spectrum 254. The original data spectrum 254 has a low frequency $f_{low}$, a high frequency $f_{high}$, and a bandwidth $\beta$. As a result of the convolution, most of the spectral energy is now contained within the nearest zero crossings 256 and 258, approximately $1/\tau$ below $f_{low}$ and $1/\tau$ above $f_{high}$. The bandwidth $\beta$ of the original data spectrum 254 has been increased by roughly $2/\tau$ to give a new bandwidth $\beta_{new}$ equal to $\beta+2/\tau$.

Substituting $\beta_{new}$ for $\beta$ in equation (1A) gives $$N_{max} = 2(\beta+2/\tau)\tau = 2\beta\tau+4 \tag{2A}$$

Thus, for short time intervals, $N_{max}$ should be increased by an additive factor of 4. Other original data spectrums would also give this relationship, but for simplicity of illustration, a box-car bandpass spectrum was chosen.

For short data trace segments, the theoretical number of attributes needed to describe the data trace segment (given by equation (2A)) may be larger than the actual number of data samples. In such cases, in order to calculate $N_{max}$ attributes, the data must be resampled to a number that is at least equal to or greater than $N_{max}$.

A theorem in information theory that provides insight into this resampling problem is found in Ziemer and Tranter, *Principles of Communications—Systems, Modulation, and Noise,* Houghton Mifflin Company, 1976, p. 71. This theorem provides that "[i]f a signal has a spectrum of bandwidth W Hz and upper frequency limit $f_u$, then a rate $f_s$ at which the signal can be sampled is $2f_u/m$, where m is the largest integer not exceeding $f_u/W$. All higher sampling rates are not necessarily usable unless they exceed $2f_u/u$." Paraphrased, this theorem says that quite often it is possible for the data to be sampled at rates less than $2f_u$, but the data may always be sampled at rates greater than $2f_u$. In seismic data processing, $f_u$ is often approximately equal to the bandwidth $\beta$ of the data. Upon adjusting this bandwidth to account for the window truncation effects (upper frequencies only) described above, we have $f_u \approx \beta+1/\tau$. Therefore, in general, the data should be sampled at a frequency $f_s$ of at least $2f_u$ which is approximately $2\beta+2/\tau$. This is equation (5) above.

If $f_u$ is not approximately equal to $\beta$ (e.g., assume $f_u \gg \beta$), then $f_s$ should be at least equal to $2\hat{f}_u$, where $\hat{f}_u = f_u+1/\tau$ (i.e., $f_u$ adjusted to account for window truncation effects). Thus, in this case, $f_s$ should be at least $2f_u+2/\tau$.

I claim:

1. A method for determining a set of independent waveform shapes which characterize a set of seismic data trace segments corresponding to a geologic zone of interest, said method comprising the steps of:

(a) datuming said seismic data trace segments to horizontally align said seismic data trace segments;

(b) determining the maximum length T of any of said seismic data trace segments and identifying all seismic data trace segments having a length equal to T;

(c) for each of said seismic data trace segments having a length less than T, augmenting said seismic data trace segment by adding a sufficient number of data samples so that the augmented length equals T;

(d) defining a matrix $\underline{A}^T$ consisting of all maximum length seismic data trace segments identified in step (b) and all augmented seismic data trace segments from step (c), where said maximum length seismic data trace segments and said augmented seismic data trace segments form the columns of said matrix $\underline{A}^T$;

(e) computing the average value of each row of matrix $\underline{A}^T$ to obtain an average data trace segment;

(f) subtracting said average data trace segment from each column in matrix $\underline{A}^T$ to obtain matrix $A^T$; and (g) solving the eigenvalue-eigenvector problem $[A^TA]V = \Lambda^2 V$ for V, where matrix A is the transpose of matrix $A^T$, V is a matrix of the independent waveform shapes which characterize said seismic data trace segments, and $\Lambda$ is the singular value matrix for the eigenvalue-eigenvector problem.

2. The method of claim 1, wherein said method further comprises the step of solving the matrix equation C=AV, where matrix C is a matrix of the weights of each of said independent waveform shapes in each of said seismic data trace segments.

3. The method of claim 1, wherein said method further comprises the step of resampling said maximum length seismic data trace segments and said augmented seismic data trace segments at a higher sample rate in order to capture substantially all of the information contained in said seismic data trace segments.

4. The method of claim 3, wherein said resampling is performed at a sample rate approximately equal to $2\beta+2/\tau$, where $\beta$ is the frequency bandwidth of said seismic data trace segments and $\tau$ is the smallest time interval duration, in seconds, in the unaugmented seismic data trace segments.

5. The method of claim 1, wherein said step of datuming said seismic data trace segments horizontally aligns the tops of said seismic data trace segments and said added data samples are added at the bottom of each seismic data trace segment having a length less than T.

6. The method of claim 1, wherein said step of datuming said seismic data trace segments horizontally aligns the bottoms of said seismic data trace segments and said added data samples are added at the top of each seismic data trace segment having a length less than T.

7. The method of claim 1, wherein said step of datuming said seismic data trace segments horizontally aligns the middles of said seismic data trace segments and added data samples are added at both the top and the bottom of each seismic data trace segment having a length less than T.

8. The method of claim 2, wherein said method further comprises the step of calculating reconstruction errors for each of said seismic data trace segments according to the following equations:

$$E_{RESIDUAL} = \frac{\sum_j \left(s_j - \sum_i w_i v_{ij}\right)^2}{\sum_j s_j^2} (100),$$

and $$E_{TOTAL} = \frac{\sum_j \left(s_j - \sum_i w_i v_{ij}\right)^2}{\sum_j (s_j + \text{bias}_j)^2} (100),$$

where $E_{RESIDUAL}$ and $E_{TOTAL}$ are, respectively, the reconstruction errors in percent of the residual and total seismic data trace segment, $s_j$ is the jth sample of the seismic data trace segment, $w_i$ are the weights contained in matrix C, $v_{ij}$ is the jth sample of independent waveform shape $v_i$, the summation over i is from i=1,m where m is the number of independent waveform shapes, and $\text{bias}_j$ is the jth sample of said average data trace segment.

9. The method of claim 8, wherein said method further comprises the step of plotting maps of said reconstruction errors.

10. The method of claim 8, wherein said method further comprises the steps of computing the range and standard deviation for each column of matrix C and using said reconstruction errors and said ranges and standard deviations to select a subset of said set of seismic data trace segments which adequately sample the statistical content of said set of seismic data trace segments.

11. A method for predicting subsurface petrophysical properties in a subsurface formation from a set of seismic data trace segments for said subsurface formation, said method comprising the steps of:

(a) obtaining well log information for at least one well in said subsurface formation;

(b) using said well log information to determine said subsurface petrophysical properties in the vicinity of each said well;

(c) determining a set of independent waveform shapes which characterize said set of seismic data trace segments;

(d) selecting a subset of said seismic data trace segments for use in calibrating said set of independent waveform shapes;

(e) determining a set of weights representing the amount of each of said independent waveform shapes in each of said selected seismic data trace segments;

(f) determining a relationship between said weights and said subsurface petrophysical properties in the vicinity of each said well; and (g) using said relationship to predict said subsurface petrophysical properties for at least one other location in said subsurface formation.

12. The method of claim 11, wherein said set of independent waveform shapes comprise Principal Components.

13. The method of claim 12, wherein said set of independent waveform shapes comprises substantially all of the Principal Components contained in said set of seismic data trace segments.

14. The method of claim 12, wherein said set of independent waveform shapes comprises a subset of the Principal Components contained in said set of seismic data trace segments.

15. The method of claim 11, wherein said set of independent waveform shapes comprise Linear Shapes.

16. The method of claim 15, wherein said set of independent waveform shapes comprises substantially all of the Linear Shapes contained in said set of seismic data trace segments.

17. The method of claim 15, wherein said set of independent waveform shapes comprises a subset of the Linear Shapes contained in said set of seismic data trace segments.

18. The method of claim 11, wherein said step of determining a set of independent waveform shapes which characterize said set of seismic data trace segments further comprises the steps of:

(a) datuming said seismic data trace segments to horizontally align said seismic data trace segments;

(b) determining the maximum length T of any of said seismic data trace segments and identifying all seismic data trace segments having a length equal to T;

(c) for each of said seismic data trace segments having a length less than T, augmenting said seismic data trace segment by adding a sufficient number of data samples so that the augmented length equals T;

(d) defining a matrix $\underline{A}^T$ consisting of all maximum length seismic data trace segments identified in step (b) and all augmented seismic data trace segments from step (c), where said maximum length seismic data trace segments and said augmented seismic data trace segments form the columns of said matrix $\underline{A}^T$;

(e) computing the average value of each row of matrix $\underline{A}^T$ to obtain an average data trace segment;

(f) subtracting said average data trace segment from each column in matrix $\underline{A}^T$ to obtain matrix $A^T$; and (g) solving the eigenvalue-eigenvector problem $[A^T A]V = \Lambda^2 V$ for V, where matrix A is the transpose of matrix $A^T$, V is a matrix of the independent waveform shapes which characterize said seismic data trace segments, and $\Lambda$ is the singular value matrix for the eigenvalue-eigenvector problem.

19. The method of claim 11, wherein said at least one well includes at least one pseudo well.

20. The method of claim 11, wherein said subset of seismic data trace segments for use in calibrating said set of independent waveform shapes comprises seismic data trace segments from the vicinity of each said well.

21. A method for determining whether a pseudo-well synthetic seismic trace segment is statistically consistent with a set of seismic data trace segments for a subsurface formation, said pseudo-well synthetic seismic trace segment being derived from well log data obtained from at least one well in said subsurface formation, said method comprising the steps of:

(a) determining a set of independent waveform shapes which characterize said set of seismic data trace segments;

(b) determining a first set of weights representing the amount of each of said independent waveform shapes in said pseudo-well synthetic seismic trace segment; and (c) using said first set of weights to determine whether said pseudo-well synthetic seismic trace segment is statistically consistent with said set of seismic data trace segments.

22. The method of claim 21, wherein said set of independent waveform shapes comprise Principal Components.

23. The method of claim 22, wherein said set of independent waveform shapes comprises substantially all of the Principal Components contained in said set of seismic data trace segments.

24. The method of claim 22, wherein said set of independent waveform shapes comprises a subset of the Principal Components contained in said set of seismic data trace segments.

25. The method of claim 21, wherein said set of independent waveform shapes comprise Linear Shapes.

26. The method of claim 25, wherein said set of independent waveform shapes comprises substantially all of the Linear Shapes contained in said set of seismic data trace segments.

27. The method of claim 25, wherein said set of independent waveform shapes comprises a subset of the Linear Shapes contained in said set of seismic data trace segments.

28. The method of claim 21, wherein said step of determining a set of independent waveform shapes which characterize said set of seismic data trace segments further comprises the steps of:

(a) datuming said seismic data trace segments to horizontally align said seismic data trace segments;

(b) determining the maximum length T of any of said seismic data trace segments and identifying all seismic data trace segments having a length equal to T;

(c) for each of said seismic data trace segments having a length less than T, augmenting said seismic data trace segment by adding a sufficient number of data samples so that the augmented length equals T;

(d) defining a matrix $\underline{A}^T$ consisting of all maximum length seismic data trace segments identified in step (b) and all augmented seismic data trace segments from step (c), where said maximum length seismic data trace segments and said augmented seismic data trace segments form the columns of said matrix $\underline{A}^T$;

(e) computing the average value of each row of matrix $\underline{A}^T$ to obtain an average data trace segment;

(f) subtracting said average data trace segment from each column in matrix $\underline{A}^T$ to obtain matrix $A^T$; and (g) solving the eigenvalue-eigenvector problem $[A^T A]V = \Lambda^2 V$ for V, where matrix A is the transpose of matrix $A^T$, V is a matrix of the independent waveform shapes which characterize said seismic data trace segments, and $\Lambda$ is the singular value matrix for the eigenvalue-eigenvector problem.

29. The method of claim 28, wherein said method further comprises the step of solving the matrix equation C=AV, where matrix C is a second set of weights representing the amount of each of said independent waveform shapes in each of said seismic data trace segments.

30. The method of claim 29, wherein said step of using said first set of weights to determine whether said pseudo-well synthetic seismic trace segment is statistically consistent with said set of seismic data trace segments further comprises the steps of performing a cluster analysis of the columns of said matrix C and comparing said first set of weights to the results of said cluster analysis.

31. The method of claim 29, wherein said step of using said first set of weights to determine whether said pseudo-well synthetic seismic trace segment is statistically consistent with said set of seismic data trace segments further comprises computing the ranges of the columns of matrix C and determining whether said first set of weights fall within said ranges.

32. The method of claim 29, wherein said step of using said first set of weights to determine whether said pseudo-well synthetic seismic trace segment is statistically consistent with said set of seismic data trace segments comprises calculating reconstruction errors according to the following equations:

$$E_{RESIDUAL} = \frac{\sum_j \left( s_j - \sum_i w_i v_{ij} \right)^2}{\sum_j s_j^2} (100),$$

and $$E_{TOTAL} = \frac{\sum_j \left( s_j - \sum_i w_i v_{ij} \right)^2}{\sum_j (s_j + bias_j)^2} (100),$$

where $E_{RESIDUAL}$ and $E_{TOTAL}$ are, respectively, the reconstruction errors in percent of the residual and total pseudo-well synthetic seismic trace segment, $s_j$ is the jth sample of the residual pseudo-well synthetic seismic trace segment, $w_i$ is said first set of weights, $v_{ij}$ is the jth sample of independent waveform shape $v_i$, the summation over i is from i=1,m where m is the number of independent waveform shapes, and $bias_j$ is the jth sample of said average data trace segment.

33. The method of claim 32, wherein said method further comprises the step of plotting maps of said reconstruction errors.

34. The method of claim 21, wherein said first set of weights is calculated by determining the vector dot product of said pseudo-well synthetic seismic trace segment with each of said independent waveform shapes.

35. A method for determining a set of independent geometric patterns which capture substantially all of the geometric patterns in a set of seismic data trace segments corresponding to a geologic zone of interest, said method comprising the steps of:

(a) datuming said seismic data trace segments to horizontally align said seismic data trace segments;

(b) determining the maximum length T of any of said seismic data trace segments;

(c) augmenting each seismic data trace segment having a length less than T by adding a sufficient number of data samples so that the augmented length equals T;

(d) selecting a plurality of reference trace segments at various locations in said set of seismic data trace segments;

(e) concatenating each said reference trace segment with a plurality of other seismic data trace segments in the vicinity of said reference trace segment to form a plurality of supertrace segments;

(f) defining a matrix $\underline{A}^T$ of said supertrace segments, where said supertrace segments form the columns of said matrix $\underline{A}^T$;

(g) computing the average value of each row of matrix $\underline{A}^T$ to obtain an average supertrace segment;

(h) subtracting said average supertrace segment from each column in matrix $\underline{A}^T$ to obtain matrix $A^T$; and (i) solving the eigenvalue-eigenvector problem $[A^T A] V = \Lambda$ for V, where matrix A is the transpose of matrix $A^T$, V is a matrix of the independent geometric patterns in said set of seismic data traces, and $\Lambda$ is the singular value matrix for the eigenvalue-eigenvector problem.

36. The method of claim 35, wherein said method further comprises the step of solving the matrix equation $C = AV$, where matrix C is a matrix of the weights of each of said independent geometric patterns in each of said supertrace segments.

* * * * *